(12) United States Patent
Altshuller

(10) Patent No.: US 12,490,253 B2
(45) Date of Patent: Dec. 2, 2025

(54) SYNCHRONIZED FRAMING SCHEDULING METHODS AND SYSTEMS FOR WIRELESS TREE MESH NETWORKS

(71) Applicant: Commtact LTD, Yavne (IL)

(72) Inventor: Mark Altshuller, Ganot Hadar (IL)

(73) Assignee: Commtact LTD, Yavne (IL)

(*) Notice: Subject to any disclaimer, the term of this patent is extended or adjusted under 35 U.S.C. 154(b) by 584 days.

(21) Appl. No.: 17/933,967

(22) Filed: Sep. 21, 2022

(65) Prior Publication Data

US 2023/0086686 A1 Mar. 23, 2023

Related U.S. Application Data

(60) Provisional application No. 63/247,027, filed on Sep. 22, 2021, provisional application No. 63/246,863, filed on Sep. 22, 2021.

(51) Int. Cl.
*H04W 72/12* (2023.01)
*H04W 40/22* (2009.01)
(Continued)

(52) U.S. Cl.
CPC ........... *H04W 72/12* (2013.01); *H04W 40/22* (2013.01); *H04W 72/0446* (2013.01); *H04W 84/18* (2013.01)

(58) Field of Classification Search
CPC ............. H04W 72/12; H04W 72/0446; H04W 72/535; H04W 40/22; H04W 84/18
(Continued)

(56) References Cited

U.S. PATENT DOCUMENTS 7,706,249 B2 4/2010 Akita et al.
8,599,822 B2 12/2013 Castagnoli
(Continued)

FOREIGN PATENT DOCUMENTS

GB 2549967 A 11/2017
WO 2016167431 A1 10/2016

OTHER PUBLICATIONS

IEEE Computer Society, Part 11: Wireless LAN Medium Access Control (MAC) and Physical Layer (PHY) Specifications, pp. 1-82, 2016.
(Continued)

*Primary Examiner* — Jungwon Chang
(74) *Attorney, Agent, or Firm* — FisherBroyles, LLP; Roger L. Browdy; Ronni S. Jillions

(57) ABSTRACT

There are provided for scheduling a plurality Framing Slots in one or more Multi-Frames in a synchronized hierarchical Tree Mesh network, comprising: one or more Clusters, each Cluster comprises: a Single Root Access Point (AP) used as a master of the Cluster; a plurality of Relay Nodes, one or more Station Nodes (STAs), wherein the one or more Multi-Frames comprise said plurality of Framing Slots, wherein each Framing Slot comprises downlink (DL) and uplink (UL) transmissions, the method comprising the steps of: dividing said one or more Clusters to at least two Groups of Relay Nodes; allocating, respectively, Framing Slots in said Multi-Frame per each Group of Relay Nodes of said at least two Groups of Relay Nodes, so each Group of Relay Nodes is respectively related to one or more allocated Framing Slots within the Multi-Frame.

17 Claims, 19 Drawing Sheets

(51) Int. Cl.
*H04W 72/0446* (2023.01)
*H04W 84/18* (2009.01)

(58) Field of Classification Search
USPC .......................................... 370/329; 455/450
See application file for complete search history.

(56) References Cited

U.S. PATENT DOCUMENTS

| | | | |
|---|---|---|---|
| 9,742,543 | B2 | 8/2017 | Hedayat |
| 10,181,930 | B2 | 1/2019 | Hedayat |
| 10,264,597 | B2 | 4/2019 | Shahar |
| 10,334,007 | B2 | 6/2019 | Chun et al. |
| 10,448,384 | B2 | 10/2019 | Ghosh |
| 10,469,387 | B2 | 11/2019 | Merlin et al. |
| 10,531,433 | B2 | 1/2020 | Frederiks |
| 10,673,583 | B2 | 6/2020 | Tsai et al. |
| 10,728,780 | B2 | 7/2020 | Keskitalo et al. |
| 10,911,120 | B2 | 2/2021 | Vermani |
| 2011/0268139 | A1* | 11/2011 | Caracas ................ H04J 3/0652 370/503 |
| 2012/0322492 | A1 | 12/2012 | Koo |
| 2015/0163043 | A1* | 6/2015 | Lee ....................... H04L 5/0073 370/336 |
| 2015/0327265 | A1* | 11/2015 | Lee ................... H04W 72/0446 370/315 |
| 2016/0381702 | A1* | 12/2016 | Jeong ................. H04W 74/002 370/329 |
| 2017/0055236 | A1* | 2/2017 | Levesque .......... H04W 56/0015 |
| 2018/0035387 | A1 | 2/2018 | Yang |
| 2018/0263047 | A1 | 9/2018 | Kim |
| 2019/0021108 | A1* | 1/2019 | Hampel .............. H04W 72/535 |
| 2021/0068096 | A1 | 3/2021 | Abedini et al. |
| 2021/0168712 | A1* | 6/2021 | Cherian ........... H04W 52/0216 |

OTHER PUBLICATIONS

IEEE 802.11-2016, Draft Standard, 2019, pp. 1-780.
European Search Report of corresponding EP22195515 dated Jan. 31, 2023.

* cited by examiner

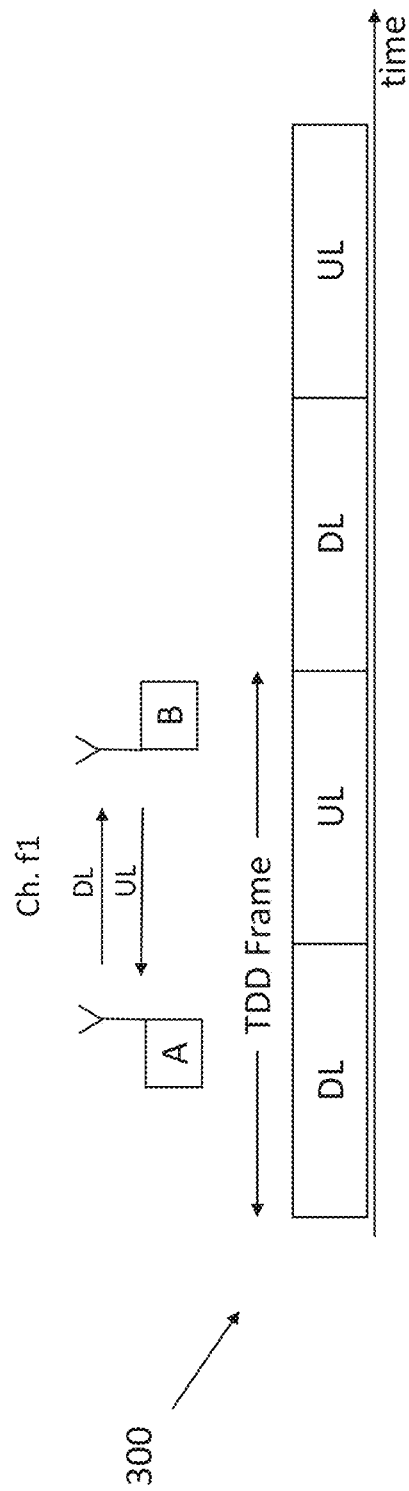

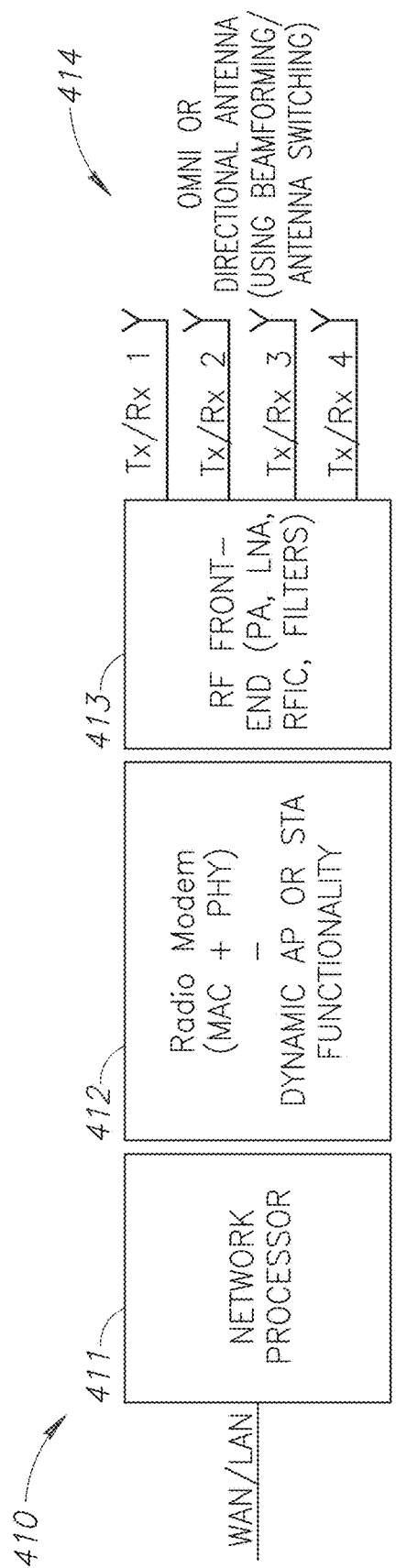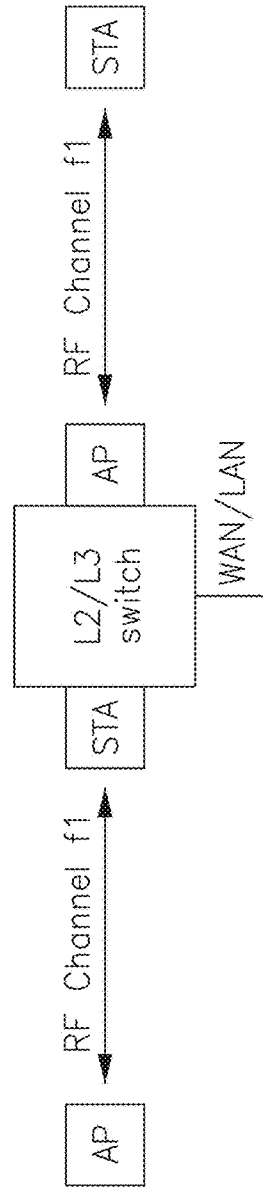
Figure 4B (PRIOR ART)
Figure 4C (PRIOR ART)
Figure 4D (PRIOR ART)

Framing Slot #0 (Maintenance) — Maintenance Framing Slot: Used by Root AP for complete Cluster Other Relay Nodes may propagate the broadcast information Framing Slot (Regular) — Used for:
- STAs only communication with Root AP
- Odd Hierarchies communication for Node Group 1 (e.g. Root AP<-->0, 1<-->2; 3-->4)
- Even Hierarchies communication for Node Group 2 (e.g. 0<-->1; 2--> 3;2n<-->2n+1)

Framing Slot (Regular) — Used for:
- Hierarchy 0 communication (for Nodes
- Odd Hierarchies communication for Node Groups (e.g. Root AP<--> 0, 1<--2, 3<-->4)

Framing Slot (Regular) — Used for:
- STAs only communication with Root AP
- Odd Hierarchies communication for Node Group 2 (e.g. Root AP<-->0, 1<-->2; 3-->4)
- Even Hierarchies communication for Node Group 1 (e.g. 0<-->1; 2-->3; 2n<-->2n+1)

Figure 7B

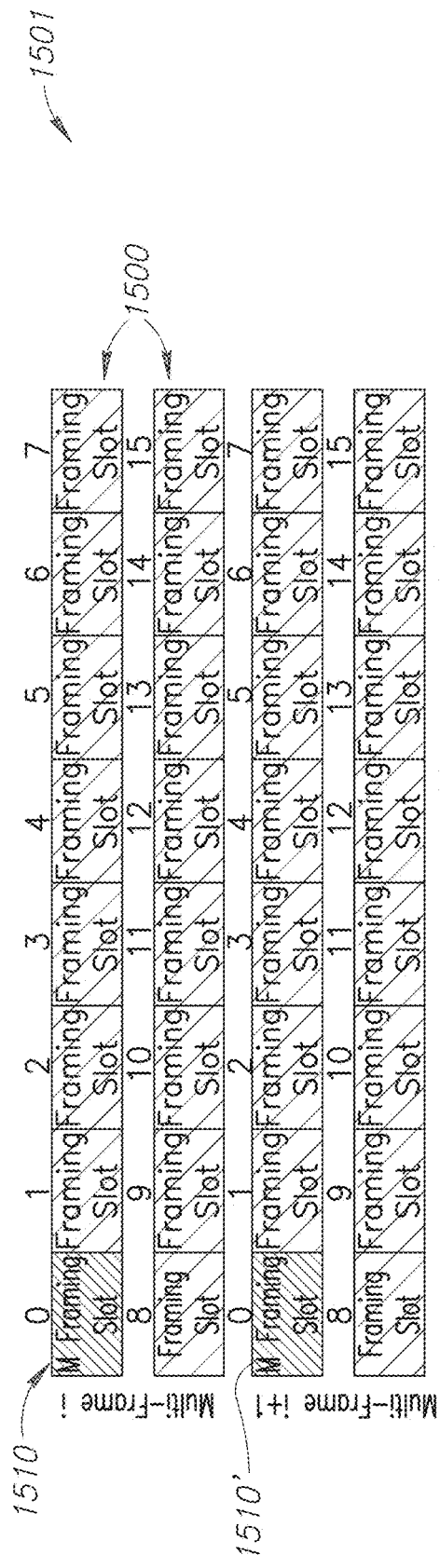
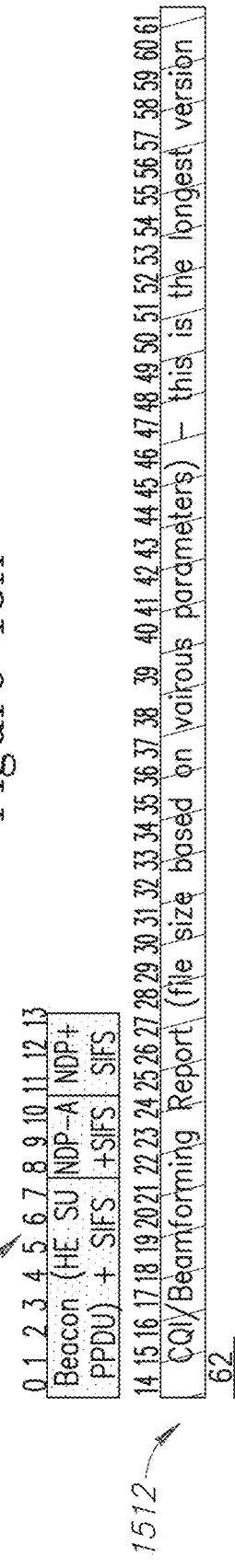
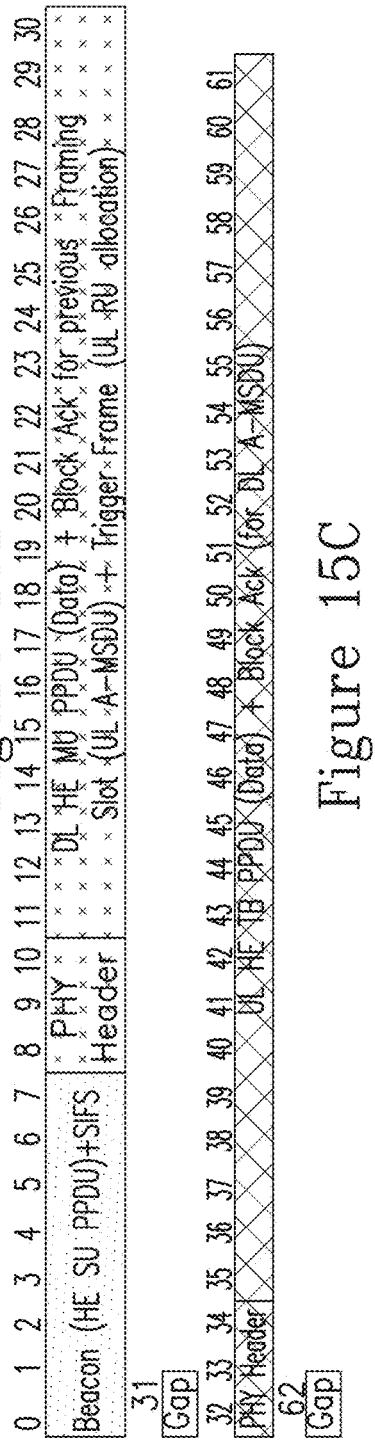
Figure 15A
Figure 15B
Figure 15C

SYNCHRONIZED FRAMING SCHEDULING METHODS AND SYSTEMS FOR WIRELESS TREE MESH NETWORKS

CROSS-REFERENCE

The present application claims priority to U.S. Provisional Application Ser. No. 63/247,027 filed on Sep. 22, 2021, entitled "SYNCHRONIZED FRAMING SCHEDULER METHODS AND SYSTEMS FOR OFDMA BASED WIRELESS SYSTEMS" and U.S. Provisional Application Ser. No. 63/246,863 filed on Sep. 22, 2021, entitled "SYNCHRONIZED FRAMING SCHEDULER METHODS AND SYSTEMS FOR OFDMA BASED WIRELESS SYSTEMS" which are incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

TECHNICAL FIELD

The present invention, in some embodiments thereof, relates to framing scheduling methods systems and devices, and more specifically, but not exclusively, to synchronized framing scheduling methods and systems for tree mesh networks.

BACKGROUND OF THE INVENTION

A wireless mesh network (WMN) is a communications network comprising a plurality of wireless routing nodes which may operate in a peer-to-peer fashion to establish communication paths with one another for the purposes of providing network access to wireless clients or mobile stations organized in a mesh topology.

Wireless mesh networks may be deployed using different wireless technologies including, for example, 802.11, 802.15, 802.16, and 3GPP (cellular technologies), and need not be restricted to any specific technology or protocol.

Some wireless mesh networks are hierarchical in nature with the routing nodes that bridge wireless traffic onto a wired network at the top of the hierarchy. The wireless mesh routing nodes can be one, two, or multiple radio systems including, for example, omnidirectional and/or directional antennas, and systems that provide backhaul traffic over the same mesh hierarchy but over multiple channels. In single radio systems, the radio unit is used to act as an access point to its clients and as a backhaul to a parent routing node.

As the number of routing nodes in WMN increases, certain problems emerge because the routing nodes essentially share the same frequency resources, and therefore compete for access to the transmission medium, resulting in radio interference. To avoid such radio interference among the routing nodes, each routing node in the WMN may generally employ a packet collision avoidance mechanism as part of the wireless communications protocol, such as the 802.11 protocol. Accordingly, a typical way of initiating communication between routing nodes begins with the transmission of a "Request-to-send" (RTS) packet by an initiating routing node. This packet is typically received by all routing nodes within the transmission range of the packet sender (i.e., initiating routing node) and is operating on the same channel, as the initiating routing node. The RTS packet notifies these routing nodes that the initiating routing node intends to transmit a flow of packets to a specified target routing node. After receiving an RTS packet, the target routing node responds by transmitting a "Clear-to-Send" (CTS) packet that notifies the initiating routing node that the target routing node is ready to receive the data stream. The CTS packet also serves to notify other routing nodes within a range that the transmission medium has been reserved such that they refrain from transmissions that might interfere with the transmission between the initiating and target routing nodes. Accordingly, since other routing nodes within range of the initiating and target routing nodes are forced to remain idle during data stream transmission, system throughput can be drastically impaired as the number of routing nodes and clients increase. Further, IEEE 802.11 or other collision avoidance mechanisms may not ensure that each routing node receives a fair share of access to the transmission medium.

Additionally, this solution is wasteful, specifically in cases where there are multiple routing nodes.

Intra-Node Interference may also be caused in current Tree Mess Topologies. For example, as shown in FIG. 6, the Intra-Node Interference related to Relay Nodes is caused when Station Nodes (STA) and Access Point (AP) functions transmit and receive signals that overlap in time.

To address these problems, WMN routing nodes can employ channel assignment schemes and mechanisms to reduce or eliminate interference between adjacent routing nodes. The limited number of non-overlapping operating channels in a given band, however, does present certain limitations for channel re-use when the number and/or density of routing nodes increases. Directional antennas have also been deployed to reduce or control interference across routing nodes. Without some coordination mechanism, however, interference between routing nodes, as well as fair access to the transmission medium, remains a significant factor.

Present multi-hierarchical and relay wireless communication solutions are used to extend the wireless coverage for various technologies such as cellular relays, WiFi mesh/MANET (Mobile Adhoc NETwork), WiMAX self-backhauling, 3GPP IAB (Integrated Access & Backhaul) and the like. However, these solutions use two or more modem radios and frequency channels with large guard band between them for mesh and relay functionalities. Other known solutions, including systems and devices using single-radio modems experience reduction in performance and high overhead.

In light of the above, improved synchronized framing scheduling methods systems and devices for tree mesh networks that overcome at least some of the above-mentioned deficiencies of the prior scheduling methods and systems would be beneficial. Ideally, such scheduling methods and systems should enable simultaneous switching between downlink and uplink transmission, massive communication, latency, fast roaming, and overhead reduction.

SUMMARY OF THE INVENTION

There are provided methods systems and devices for scheduling downlink (DL) and uplink (UL) channels in a Tree Mesh network comprising two or more Clusters in a synchronized wireless network such as a synchronized hierarchical Tree Mesh network.

The methods and systems, in accordance with some embodiments, comprise allocating and/or mapping Framing Slots within Multi-Frames (such as the Multi-Frames shown in FIG. 1) for multiple associated Node Groups within a tree-mesh cluster. Specifically, the method comprises scheduling plurality Framing Slots in one or more Multi-Frames in the synchronized hierarchical Tree Mesh network.

As shown in FIG. 7A and FIG. 7B, in accordance with embodiments, a Root AP 710 is responsible for synchronizing the Nodes (such as nodes 731 and 733) within cluster 701 for a Multi-Frame 750. The synchronization method includes scheduling a plurality Framing Slots in one or more Multi-Frames in the hierarchical Tree Mesh network in a way that the Nodes (e.g. Nodes in all hierarchies) will be synchronized in time one with the others at the beginning of the Multi-Frame and Framing Slot numbering within the Multi-Frame.

In operation, the Root AP 710 divides the Clusters of Relay Nodes into at least two Groups of Relay Nodes and assigns/allocates to a portion of directly associated/connected Nodes (e.g. Hierarchy 0 Relay Nodes and STAs) to the different Node Groups. Additionally, the Root AP 710 assigns/allocates Framing Slot within a Multi-Frame to the directly associated Nodes per Node Group.

In accordance with embodiments, the Cluster of Relay Nodes is divided into a number of Groups where each Group has specific allocation of Framing Slot portion within the one or more Multi-Frames. Therefore, each specific Relay Nodes' Group is respectively related to Framing Slots and/or to a portion of Framing Slots within the Multi-Frame.

In accordance with some embodiments, the tree mesh cluster 701 shown in FIG. 7A and related Multi-Frame 750 are divided into three groups, for example, as follows:

Groupe one: comprises Framing Slots which are used for communication between the Root AP and all directly associated Nodes (e.g. Hierarchy 0). During these Framing Slots the Hierarchy 0 Relay Nodes cannot communicate with the next hierarchy associated Nodes (Hierarchy 1), but Hierarchy 1 Relay Nodes may communicate with Hierarchy 2 associated Nodes. In such a way, during this portion of Framing Slots the communication is possible for even Hierarchy Levels between the Relay Nodes and associated Nodes (for instance Hierarchy Levels of 0, 2, 4, 6, ... 2n)

Group two: comprises Framing Slots which are used for one of the Node Groups. The Relay Nodes in this Node Group, which are connected directly to the Root AP (in Hierarchy Level 0) and communicate with the associated Nodes in Hierarchy Level 1. In such a way, during this group on Framing Slots, communication is possible for odd Hierarchy Levels between the Relay Nodes and associated Nodes (for instance Hierarchy Levels of 1, 3, 5, 7, ... 2n+1).

Group three: comprises Framing Slots which may be used for additional Node Groups similarly. During these Framing Slots group, the Root AP does not communicate with appropriate Hierarchy Level 1 Nodes within the relevant associated Relay Nodes of the Node Group.

In some embodiments, Node STAs (which are not Relays) connected to the Root AP may communicate during the Framing Slots (e.g. all Framing Slots) in the Multi-Frame and should not be part of any Node Group.

FIG. 8 shows, a method for resource allocation scheduling serving Tree-Mesh topology 800 based on Framing Slot 850 Time Division, in accordance with embodiments. The method comprises dividing Framing Slot 850, for example, in time domain for multiple subgroups. In the example shown in FIG. 8 the Framing Slot 801 is divided to two subgroup divisions subgroup 851 and subgroup 852, however, embodiments according to the present invention are not limited to any specific number of subgroups and Framing Slot 850 may be divided to multiple subgroups.

In accordance with embodiments, the DL and UL direction in Framing Slot 850 includes multiple transmission time-zones. Each time-zone can be used for one of the Node Groups (e.g. Node Group 1 or Node Group 2) or by Root AP to serve some or all associated STAs. Specifically, FIG. 8 shows an example where the first time-zone within the Framing Slot used for DL and UL transmissions is allocated for AP to serve all associated STAs and the other time-zone is used for one of Node Groups.

Maintenance Framing Slot Specifics

In accordance with some embodiments, each Multi-Frame of a plurality of Multi-Frames comprises at least one Maintenance Framing Slot. Maintenance Framing Slot main goals include distributing information per Tree-Mesh Cluster (e.g. broadcasting announcement).

In accordance with some embodiments, Beacon message can be used for 802.11 networks.

In accordance with some embodiments, the Root AP which is used as a Cluster Master is configured and enabled to distribute or broadcast the Announcement Message (e.g. 802.11 Beacon). Additionally, the Announcement Message should be listened by the Nodes (e.g. all Nodes) within Tree-Mesh Cluster.

In accordance with some embodiments, to improve the broadcast signal propagation, Relay Nodes may also broadcast the same Beacon Message (on behalf of Root AP) which is completely synchronized with the Root AP within the Maintenance Framing Slot, and as such enabling signal diversity within the cluster.

In accordance with embodiments, the broadcasted Beacon Message includes information for the Tree-Cluster management, such as:

Scheduler profile as illustrated by the present applicant invention: U.S. Provisional Patent Application No. 63/246,863 entitled SYNCHRONIZED FRAMING SCHEDULER METHODS AND SYSTEMS FOR OFDMA BASED WIRELESS SYSTEMS, which is incorporated herein by reference in its entirety;

Cluster identification (as will be described further in detail hereinbelow)

Relay Node Group allocation per specific Framing Slots within the Multi-Frame;

Scanning opportunities per specific Framing Slots, within the Multi-Frame. During these Framing Slots the Nodes, within the Cluster, may scan the network (e.g. for searching better Neighboring Node for roaming purposes), distributing information enabling new Nodes to be associated within the Cluster;

List of Relay STAs within the cluster and their Hierarchy Level—enabling new or roaming STA to scan and connect to the Relay STAs.

LTE and 5GNR Approach for Tree Mesh Grouping

FIG. 11 shows LTE and 5GNR general Relay architecture, in accordance with embodiments. LTE/5GNR Relay Node has similar architecture as 802.11 networks. Moreover, LTE/5G Relay functions similar to IAB (Integrated Access-Backhaul) node as defined by 3GPP.

In accordance with embodiments, there are provided methods and systems for avoiding intra-node interference and therefore preventing cases where signal transmission of one radio interferes with signal reception of another radio. Accordingly, the Relay Grouping methods and systems as provided by the present invention avoid such self-interference.

FIG. 12 shows Tree Mesh Cluster Scheduling and grouping based on LTE/5GNR Multi-Frame structure, in accordance with embodiments.

In an embodiment, the Root eNB divides the Tree Mesh Relays, for example, into two Relay Node Groups. For example, a group of elements which are not part of any Relay Node and a Group including UEs.

In accordance with embodiments, there are provided methods, systems and devices which define the mechanism where the LTE DL or UL slots are used for different Node Relay Groups. Specifically, as shown in FIG. 12 the scheduling and mechanism may include allocating the resources in the Framing Slot as follows:

Part of the Slot for DL and UL can be used for RB resource allocation to the UEs (e.g. all UEs) and Relay Nodes in EVEN Hierarchies (e.g. 0, 2, 4, . . . 2n);

Other parts of the Slots for DL and UL can be used for RB resource allocation to UEs and Relay Node Group 1 of EVEN Hierarchies (e.g. 0, 2, 4, . . . 2n) and for Relay Nodes Group 2 of ODD Hierarchies (e.g. 1, 3, 5, . . . 2n−1);

Other parts of the Slots for DL and UL can be used for RB resource allocation to UEs and Relay Node Group 2 of EVEN Hierarchies (e.g. 0, 2, 4, . . . 2n) and for Relay Nodes Group 1 of ODD Hierarchies (e.g. 1, 3, 5, . . . 2n−1);

In some cases, such Relay Node Groups allocation may be repeated or changed per each Multi-Frame level, where each Multi-Frame comprises n LTE/5GNR frames and a related number of slots (e.g. for LTE case if Multi-Frame has 30 frames, it has 60 slots).

In some cases, the allocation mapping may be on slot resolution (for example for each slot 0, 1 . . . n in a single frame as shown in FIG. 12) or on frame resolution (for example for each Frame as defined in LTE/5G (or equivalent to Framing Slot as defined in the present invention). Such allocation mapping is pre-configured in the system or broadcasted in the control message periodically as shown in FIG. 12. Such broadcast control message delivers equivalent information to the Beacon message as explained in the 802.11 part of this invention.

In accordance with embodiments, as explained hereinabove with respect to 802.11 network configuration of the present invention, also LTE & 5GNR tree-mesh management may include update procedures and such messages are delivered as additional information using for example LTE & 5GNR existing MAC control channels (e.g. extension to 3GPP defined RLC or RRC) or as completely new messaging structure using PDSCH and PUSCH channels.

In accordance with embodiments of the present invention there is provided a method for scheduling a plurality Framing Slots in one or more Multi-Frames in a synchronized hierarchical Tree Mesh network, wherein said synchronized hierarchical Tree Mesh network comprising: one or more Clusters, each Cluster of said one or more Clusters comprises: a Single Root Access Point (AP) used as a master of the Cluster; a plurality of Relay Nodes, which are associated directly to the Single Root AP or associated via other Relay Nodes of the plurality of Relay Nodes within the Cluster; one or more Station Nodes (STAs), which are associated directly to the Single Root AP or associated via other Relay Nodes of the plurality of Relay Nodes within the Cluster; and wherein said one or more Multi-Frames comprise said plurality of Framing Slots, wherein each Framing Slot of said plurality of Framing Slots comprises downlink (DL) and uplink (UL) transmissions, said method comprising the steps of: dividing said one or more Clusters to at least two groups of Relay Nodes; allocating, respectively, Framing Slots in said Multi-Frame per each Group of Relay Nodes of said at least two groups of Relay Nodes, so each Group of Relay Nodes is respectively related to one or more allocated Framing Slots within the Multi-Frame.

In an embodiment, the method comprises allocating Framing Slots to three or more groups of Framing Slots.

In an embodiment, the method comprises dividing said one or more Clusters to a first Group of Relay Nodes, a second Group of Relay Nodes and a Group of STA Only Nodes, wherein said Groups of STA Only Nodes comprise STA Only Nodes directly associated to the Root AP; allocating Framing Slots of said one or more Multi-Frames to three groups, wherein: a First Group of Framing Slots comprises: allocated Framing Slots for associated Node Relays from the first Group of Relay Nodes; a Second Group of Framing Slots comprises: allocated Framing Slots for associated Node Relays from the second Group of Relay Nodes; a Third Group of Framing Slots comprises: allocated Framing Slots for Groups of STA Only Nodes.

In an embodiment, the step of allocating the first group of framing slots comprises allocating the first group of Framing Slots for communication of EVEN hierarchies (hierarchies 0, 2, . . . 2n) of the first Group of Relay Nodes of the said hierarchical Tree Mesh and serving communication of the ODD hierarchies (e.g. 1, 3, . . . 2n+1) of the second Group of Relay Nodes of the hierarchical Tree Mesh; and wherein the step of allocating the second group of Framing Slots comprises allocating the second group for communication of EVEN hierarchies (hierarchies 0, 2, . . . 2n) of the second Group of Relay Nodes of the said hierarchical Tree Mesh and for communication of the ODD hierarchies (hierarchies 1, 3, . . . 2n+1) of the first Group of Relay Nodes of the said hierarchical Tree Mesh; and the step of allocating the third group of the Framing Slots comprises allocating the third group for communication of STA Nodes only directly associated to the Root AP.

In an embodiment, the STA Nodes only associated directly to the Root AP are allocated by all three groups of Framing Slots.

In an embodiment, one of the Framing slots of the plurality of Framing Slot is allocated as a Maintenance Framing Slot.

In an embodiment, the plurality of Relay Nodes have single-radio architecture or dual-radio architecture which use the same or adjacent RF channels.

In an embodiment, each Framing Slot of said one or more Multi-Frames is divided to multiple time periods for said DL and UL transmissions where each time period of said multiple time periods within the Framing Slot is used by said at least two Groups of Relay Nodes communicating in EVEN or ODD Hierarchy Levels.

In an embodiment, the method comprising: announcing by the Root AP the Tree Mesh scheduling profile, once any tree mesh topology change caused by new node entry or existing node leaving the cluster the scheduling profile comprises Relay Node distribution between the Node Groups and time resource allocation per each Node Group of Framing Slots or the Framing Slot DL and UL allocation per each Node Group.

In an embodiment, the method comprises: updating a Hierarchy Level of any new STA Node or roaming Node, connected to the Cluster and existing Node disconnected from the Cluster.

In an embodiment, the Hierarchy Level update procedure is initiated as Broadcast Announcement Procedure or as Unicast Procedure.

In an embodiment, the Broadcast Announcement Procedure comprises: executing by the New/Roaming STA Node an Association Procedure; updating the Root AP by a serving Relay Node with an Update Message, which is sent through the serving Relay Nodes within the Cluster; Relay Nodes and Root AP updating their list of Relay IDs and their Hierarchy Level;

distributing the next Broadcast Message by Root AP or by Relay APs within the Cluster with updated Relay List Nodes said list comprises Hierarchy Level and Node Group per each Relay Node within the Cluster.

In an embodiment, the Unicast Announcement Procedure comprises: executing by the New/Roaming STA Node an Association Procedure, transmitting Cluster Hierarchy Level update information about the specific Hierarchy Level and Node Group is sent as unicast in one or more Response Messages during the Association Procedure, wherein the Hierarchy Level information delivery is relevant for Node STA new network entry process as well as roaming process between APs within the cluster or between the clusters.

In an embodiment, the Broadcast Control information is sent by the Root AP for the Nodes within the Cluster and wherein the Broadcast information delivers the Nodes with the Node Group mapping of the Framing Slots per one or more Multi-Frames.

In accordance with a second embodiment of the present invention there is provided a Root Access Point (AP) for scheduling a plurality Framing Slots in one or more Multi-Frames in a synchronized hierarchical Tree Mesh network, wherein said hierarchical Tree Mesh network comprises: one or more Clusters, wherein each Cluster of said one or more Clusters comprises: a plurality of Relay Nodes, which are associated directly to the Root AP or associated via other Relay Nodes within the Cluster; one or more Station Nodes (STAs), which are associated directly to the Root AP or associated via other Relay Nodes within the Cluster; and wherein each Framing Slot of said plurality Framing Slots comprises downlink (DL) and uplink (UL) transmissions, said root AP comprises: a transceiver configured to transmit and receive a wireless signal; and a processor configured and enabled to control the transceiver, wherein the processor comprises instructions to: divide said one or more Clusters to at least two Groups of Relay Nodes, and allocate, respectively, said plurality Framing Slots in said one or more Multi-Frames per each Group of at least two Groups Relay Nodes, so each Group is respectively related to one or more allocated Framing Slots within the Multi-Frame.

In an embodiment, the processor comprises instructions to allocate Framing Slots to three or more groups.

In an embodiment, the processor comprises instructions to: divide said one or more Clusters to a first Group of Relay Nodes a second Group of Relay Nodes and a Groups of STA Only Node allocate said plurality of Framing Slots to three groups, wherein: a First Group of Framing Slots comprises: allocated Framing Slots for associated Node Relays from the first Node Group; a Second Group of Framing Slots comprises: allocated Framing Slots for associated Node Relays from second Node Group; a Third Group of Framing Slots comprises: allocated Framing Slots for STA Only Nodes directly associated with the Root AP.

In an embodiment, the step of allocating the first group of framing slots comprises allocating the first group of Framing Slots for communication of EVEN hierarchies (hierarchies 0, 2, . . . 2n) of the first Group of Relay Nodes of the said hierarchical Tree Mesh and serving communication of the ODD hierarchies (e.g. 1, 3, . . . 2n+1) of the second Group of Relay Nodes of the hierarchical Tree Mesh; and wherein the step of allocating the second group of Framing Slots comprises allocating the second group for communication of EVEN hierarchies (hierarchies 0, 2, . . . 2n) of the second Group of Relay Nodes of the said hierarchical Tree Mesh and for communication of the ODD hierarchies (hierarchies 1, 3, . . . 2n+1) of the first Group of Relay Nodes of the said hierarchical Tree Mesh; and the step of allocating the third group of the Framing Slots comprises allocating the third group for communication of STA Nodes only directly associated to the Root AP.

In an embodiment, the processor comprises instructions to divide each Framing Slot of said one or more Multi-Frames to multiple time periods for said DL and UL transmissions where each time period of said multiple time periods within the Framing Slot is used by said at least two Groups of Relay Nodes communicating in EVEN or ODD Hierarchy Levels.

In an embodiment, the single Root Access Point (AP) is used as a master of the Cluster.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIG. 3 shows a TDD Communication frame, in accordance with the prior art;

FIG. 4B shows a specific example of an Architecture Block Diagram comprising Network Processor, Modem and RF Front End Modules in accordance with the prior art;

FIG. 4C shows a Logic Block Diagram, in accordance with the prior art;

FIG. 4D shows an example of AP and STA functionality 43 in time domain, in accordance with the prior art;

FIG. 7B shows a block mapping of the Framing Slots in the Multi-Frame shown in FIG. 7A, in accordance with embodiments;

FIG. 13-FIG. 17 show Framing Slot and Multi-Frame Synchronized structure for 802.11 OFDMA which may be used in 802.11 system Tree Mesh scheduling, in accordance with embodiments.

DETAILED DESCRIPTION OF THE INVENTION

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figure and described in the specification, but only as indicated in the accompanying claims, with the proper scope determined only by the broadest interpretation of said claims.

As used herein, like characters refer to like elements.

Figure 1:
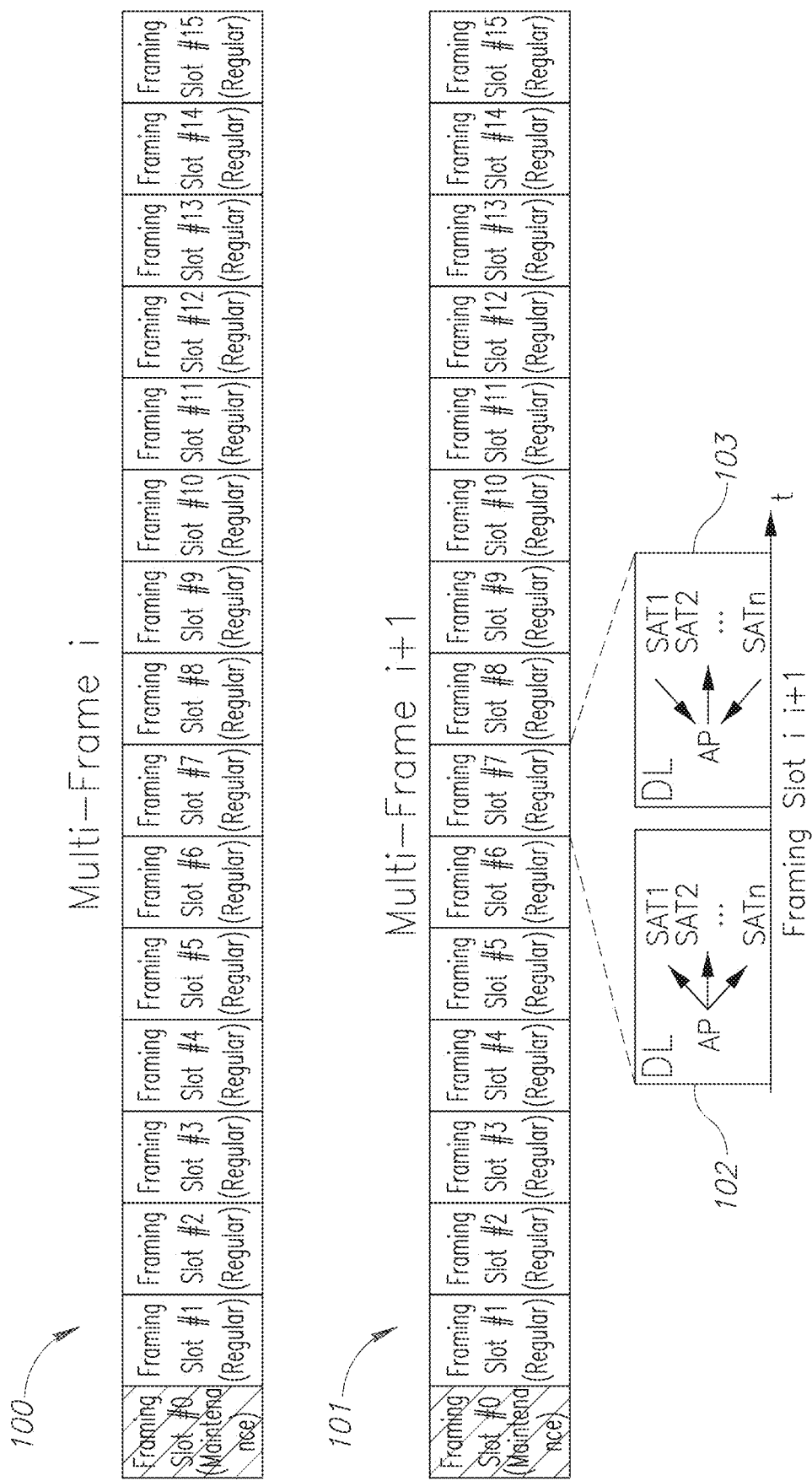
FIG. 1 shows a scheduler mechanism, in accordance with embodiments.

Prior to the detailed description of the invention being set forth, it may be helpful to set forth definitions of certain terms that will be used hereinafter. Specifically, some of these definitions are presented to align 802.1 lax terminologies presented in this invention with LTE & 5G terminology:

As used herein, the term "Framing Slot" encompasses a slot comprising a fixed time period for the AP and directly connected STAs exchange datagrams between them in DL (Downlink) and UL (Uplink) directions (as shown for example in FIG. 1). A Framing Slot may use various PTMP (point-to-multipoint) communication synchronized methods as supported in wireless industry including and not limited to TDD (Time Division Duplexing), FDD (Frequency Division Duplexing), TDMA (Time Division Multiple Access), OFDMA (Orthogonal Frequency Division Multiple Access). In LTE&5GNR a Framing Slot encompasses a subset of Sub-Frames which comprise OFDMA DL and UL transmissions.

As used herein, the term 'Multi Frame' encompasses subframes, such as Framing Slots, that are grouped or linked together to perform specific functions. The sub-frames may be LTE/5GNR sub-frames of Framing Slots. A Multi-Frame structure of LTE/5GNR may include n*frames (n=1, 2, 3, 4, . . . ). Meaning; if n=3 so LTE/5GNR Multi-Frame is 3*10=30 sub-frames.

As used herein the term 'Other Relay Nodes' encompasses any Relay Node in the Cluster which is not the Node itself.

As used herein, the term 'AP' (Access Point 802.11 master) encompasses eNB and gNB for LTE and 5GNR respectively.

As used herein, the term 'Root AP' encompasses the main gateway wireless node connecting the wireless STAs to the transport network.

As used herein, the term 'Relay Node' encompasses a node which enables multi-hop connectivity between different hierarchies of the network. Hierarchy level is defined as the number of hops from the Root AP. Relay Node supports AP and STA functionalities.

As used herein, the term STA encompasses a common wireless device connected to one of the APs (e.g. Root or Relay), such as 802.11 STA or LTE/5GNR UE (User Equipment).

As used herein, the term 'Resource Unit (RU)' in 802.1 lax is equivalent to 'Resource Block' (RB) term in LTE/5GNR for OFDMA PHY structure to communicate with multiple STAs/UEs.

The present invention, in some embodiments thereof, relates to framing scheduling methods, and specifically to synchronized framing scheduling methods for tree mesh networks.

In accordance with embodiments, the synchronized framing scheduling methods, systems and devices comprise using a Multi-Frame which comprises a plurality of Framing Slots in WMN.

The methods, systems and devices in accordance with embodiments comprise scheduling a plurality Framing Slots in one or more Multi-Frames in a Tree Mesh network such as a synchronized hierarchical Tree Mesh network, wherein the synchronized hierarchical Tree Mesh network comprises: one or more Clusters, each Cluster of the one or more Clusters comprises: a Single Root Access Point (AP) used as a master of the Cluster; a plurality of Relay Nodes, which are associated directly to the Root AP or associated via other Relay Nodes of the plurality of Relay Nodes within the Cluster; one or more Station Nodes (STAs), which are associated directly to the Root AP or associated via other Relay Nodes plurality of Relay Nodes within the Cluster; and wherein the one or more Multi-Frames comprise the plurality of Framing Slots, wherein each Framing Slot comprises downlink (DL) and uplink (UL) transmissions, the method comprising the steps of: dividing the one or more Clusters to at least two Groups of Relay Nodes; and allocating, respectively, Framing Slots in said Multi-Frame per each Group of Relay Nodes of the at least two Groups of Relay Nodes, so each Group of Relay Nodes is respectively related to one or more allocated Framing Slots within the Multi-Frame.

In WMN a Single-Radio Relay Node can't function simultaneously (while for example AP and STA may function simultaneously). Therefore, in accordance with embodiments, the Relay Node supports dynamic switching between AP and STA modes, per internal logic.

Advantageously, the systems, devices and methods in accordance with embodiments are configured and enabled to provide throughput, latency, and mobility events control in multi-hierarchical tree-mesh wireless networks for high-quality communication using for example a single-radio modem.

FIG. 1 shows a plurality of synchronized Multi-Frames 100 (e.g. Multi-Frame i, Multi-Frame i+1) and a Multi-Frame structure 101 as may be used in accordance with embodiments. A detailed description of Multi-Frame structure 101 and other types of scheduling methods that may be used in accordance with embodiments are illustrated in U.S. Provisional Application No. 63/246,863 entitled SYNCHRONIZED FRAMING SCHEDULER METHODS AND SYSTEMS FOR OFDMA BASED WIRELESS SYSTEMS, which is incorporated herein by reference in its entirety.

It is stressed that other types of schedulers and/or scheduling methods and systems may be used.

Specifically, in a wireless synchronized system, a Multi-Frame includes a constant number of consequent Framing Slots. The Framing Slots within the Multi-Frame are numbered (e.g. from 0 to 15 as shown in FIG. 1). For each Multi-Frame the Framing Slot sequent numbering is restarted from the beginning of the Multi-Frame. Framing Slot duration and the number of Framing Slots per each Multi-Frame defines the fixed time period of the Multi-Frame.

In accordance with embodiments, each Node within the network is synchronized in timing for the transmission at the beginning of the Multi-Frame and as such each Node may compute the same Framing Slot sequent number in each Multi-Frame simultaneously. The number of Framing Slots and Framing Slot duration may vary between different Multi-Frames, which accordingly defines Multi-Frame structure profile. Such Multi-Frame structure profile may be announced, for example, at the beginning of the Multi-Frame by for example a Root AP within a Maintenance Framing Slot (as shown in FIG. 1).

In the example shown in FIG. 1, each Multi-Frame (e.g. Multi-Frame i, Multi-Frame i+1) comprises 16 Framing Slots (#0 to #15).

It is stressed that the present invention is applicable for any number of Framing Slots per Multi-Frame.

In the synchronized Multi-Frames 100, the Multi-Frames are cascaded continuously one after the other (e.g. i, i+1). Additionally, each Multi-Frame has at least one Maintenance Framing Slot and Regular Framing Slots (Regular Framing Slot are defined as 'not a Maintenance Framing Slot').

In accordance with embodiments, the Maintenance Framing Slot is used for broadcasting the maintenance information by the Root AP within the cluster and may be used for other purposes such as Beamforming training and calibration as specified for example in 802.11ax.

As shown in FIG. 1, each Regular Framing Slot such as Framing Slot #7 in Multi-Frame i+1 comprises DL 102 and UL 103 transmissions periods between AP and associated STAs. The communication between AP and STAs may be PTMP (point-to-multipoint); OFDMA, TDM. It is stressed that other types of PTMP communications may be used.

Figure 2:
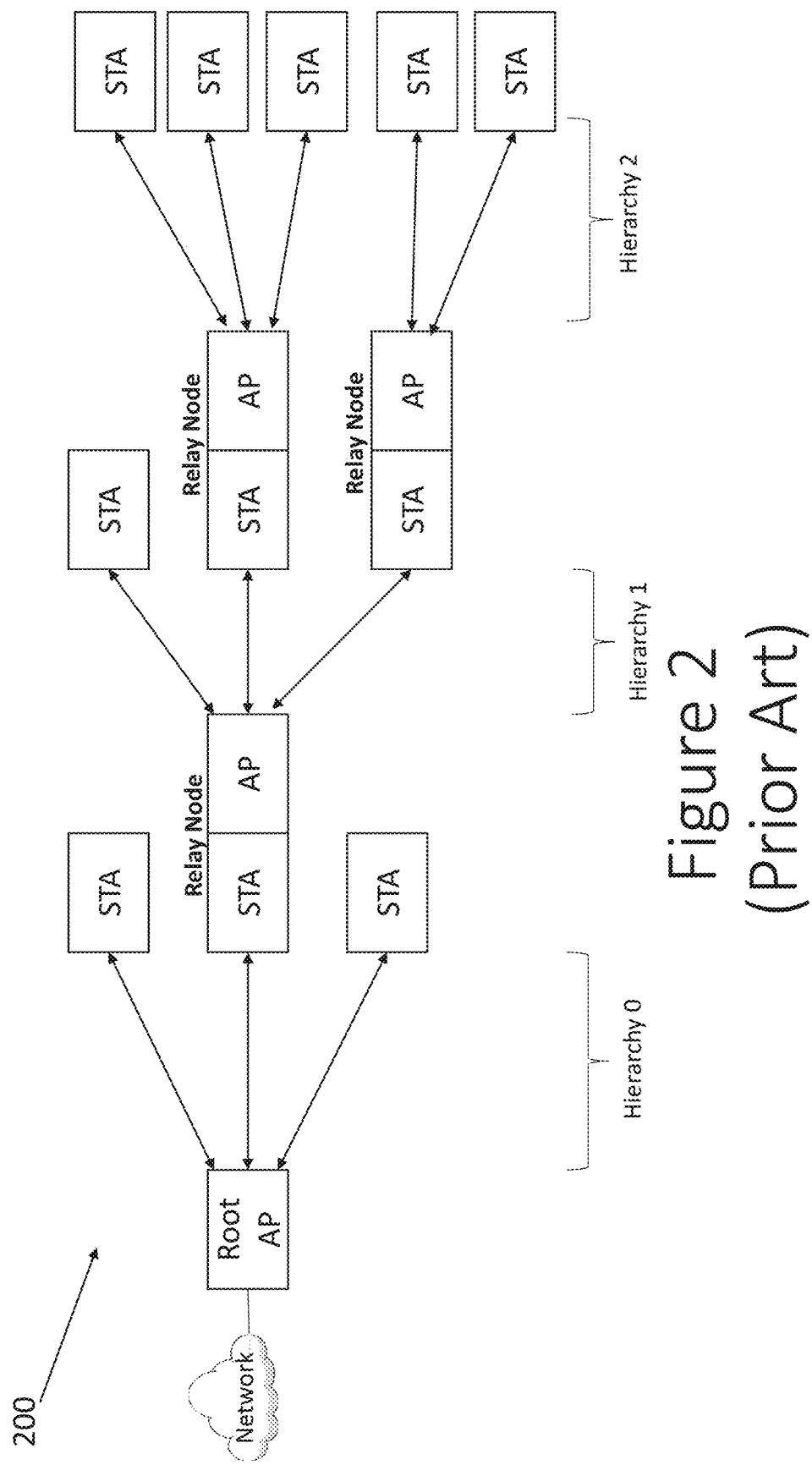
FIG. 2 illustrates a wireless tree-mesh topology, in accordance with the prior art.

FIG. 2 shows an example of a wireless tree-mesh topology 200, in accordance with embodiments. The tree-mesh 200 is a hierarchical multi-hop communication network. As explained above, the tree-mesh topology uses three main wireless node functions:

Root AP—main gateway wireless node connecting the wireless STAs to the transport network;

Relay Node—enables multi-hop connectivity between different hierarchies of the network. Hierarchy level is defined as the number of hops from the Root AP. Relay Node supports AP and STA functionalities.

STA—this is a common wireless device connected to one of the APs (Root or Relay).

In accordance with embodiments, the method for scheduling plurality of Framing Slots in one or more Multi-Frames relates to a Synchronized Hierarchical Tree Mesh network.

Specifically, in a Synchronized Hierarchical Tree Mesh Networks one of the Wireless Nodes is used as Root AP/BS. Root AP/BS is used as the master clock for the other Wireless Nodes within the Tree Mesh network topology. Hence, all Wireless Nodes simultaneously start and end Framing Slot transmissions and uses the same sequence counting of Framing Slots within the Multi-Frame. Other Wireless Nodes are used as Wireless Relay Nodes or STAs. Additionally, other Wireless Nodes connected to the Root AP/BS or to one of the Relay Nodes within the Mesh network and as such it creates an Hierarchical Tree Mesh Topology as shown in FIG. 2.

FIG. 3 shows a TDD (Time Division Duplex) Communication frame 300, in accordance with embodiments. As shown, Nodes A and B communication includes using the synchronized TDD Frame structure 300. Each TDD Frame includes time periods for DL (downlink) and for UL (uplink) transmissions.

FIG. 4A, FIG. 4B FIG. 4C and FIG. 4D show a Wireless Relay Node physical and functional architecture, such as Single-Radio architecture and avoidance of self-interference, in accordance with the prior art.

Figure 4A:
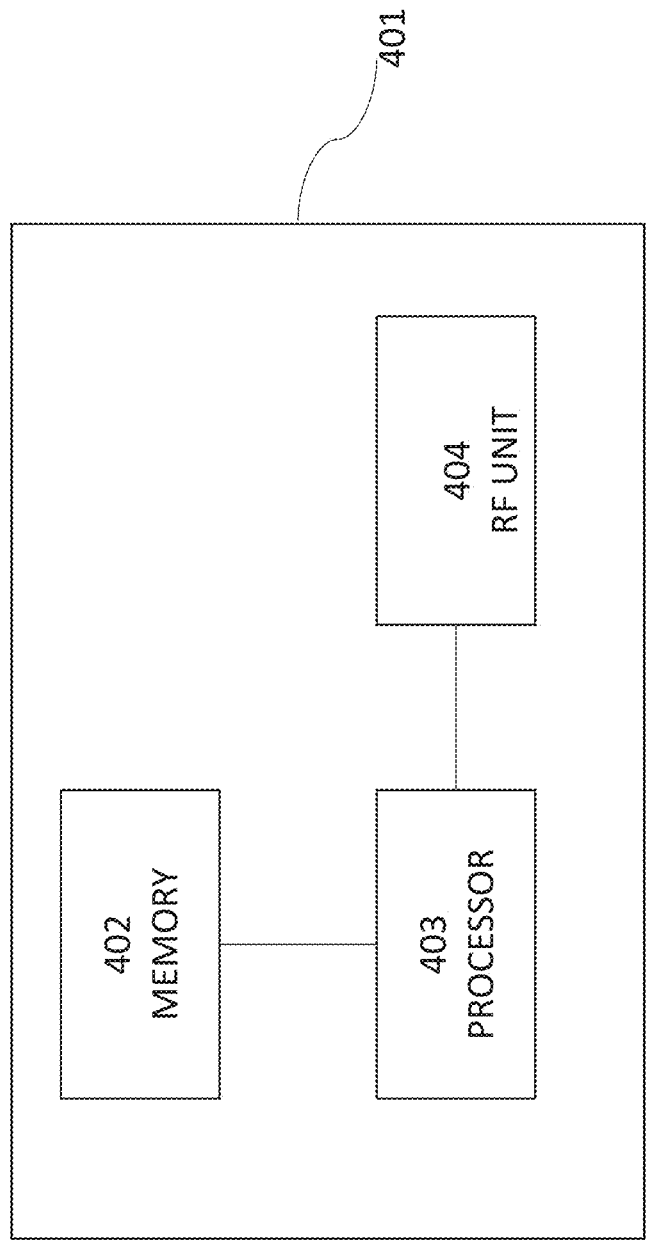
FIG. 4A is a block diagram of a device such as AP/Relay Node/STAs, in accordance with the prior art.

FIG. 4A is a block diagram of a device 401 such as AP/Relay Node/STAs in accordance with the prior art.

In FIG. 4A, device 401 may include a memory 402, one or more processors such as processor 403 and one or more Radio Frequency (RF) units such as RF unit 404.

In some cases, the RF unit 404 may be connected to the processor 402 and may transmit/receive one or more radio signals via one or more RF antennas. The RF unit 403 may transmit the signals by up-converting data received from the processor 403 to a transmission/reception band.

In some cases, the RF unit 404 may include one or more transmitters for applying RF signals and one or more receivers for receiving RF signals.

In some cases, the RF unit 404 may include one or more transceivers configured and enabled to transmit and receive RF signals (wireless signals).

The processor 403 may implement the physical layer and/or the MAC layer according, for example, to the IEEE 802.11/LTE system with being connected to the RF unit 404. The processor 403 may be constructed to perform the operation according to the various embodiments of the present invention and according to the drawings and description. In addition, the module or methods for implementing the operation of the device 401 according to the various embodiments of the present invention described herein above and below may be stored in the memory 402 and executed by the processor 403. In some cases, device 401 may be the root AP or any element illustrated in the mesh network of FIG. 2.

In accordance with embodiments, the processor is configured and enabled to control the transceiver and/or the one or more transmitters and receivers.

In some cases, the memory 402 may be connected to the processor 403, and stores various types of information for execution by the processor 403. In some cases, memory 402 may be included interior of the processor 403 or installed exterior of the processor 403, and may be connected with the processor 403 by a well-known means.

In addition, device 401 may include a single antenna or a multiple antenna.

The detailed construction of the device 401 of FIG. 4A may be implemented such that the description of the various embodiments of the present invention is independently applied or two or more embodiments are simultaneously applied.

FIG. 4B shows a specific example of Architecture Block Diagram 410 comprising Networking (Network Processor 411), Modem 412 and RF Front End Modules 413 with multiple Tx/Rx ports for MIMO and Beamforming support for antennas 414, in accordance with the prior art.

Networking block 411 supports Layer2 and Layer3 datagrams (or packet) switching functionalities between the Modem block 412 and LAN/WAN port/s 413 (used for connecting to backhaul/backbone or various external devices).

In accordance with embodiments, Modem block 412 supports Wireless MAC and PHY functions, and RF Front-End block 413 supports A/D & D/A and Tx/Rx analog chains with access to the antenna ports. The antenna 414 can be OMNI or multiple directional antennas for 360° coverage. The antenna's 414 architecture is a typical single-radio block diagram as commonly used by 802.11 wireless devices.

Figure 11:
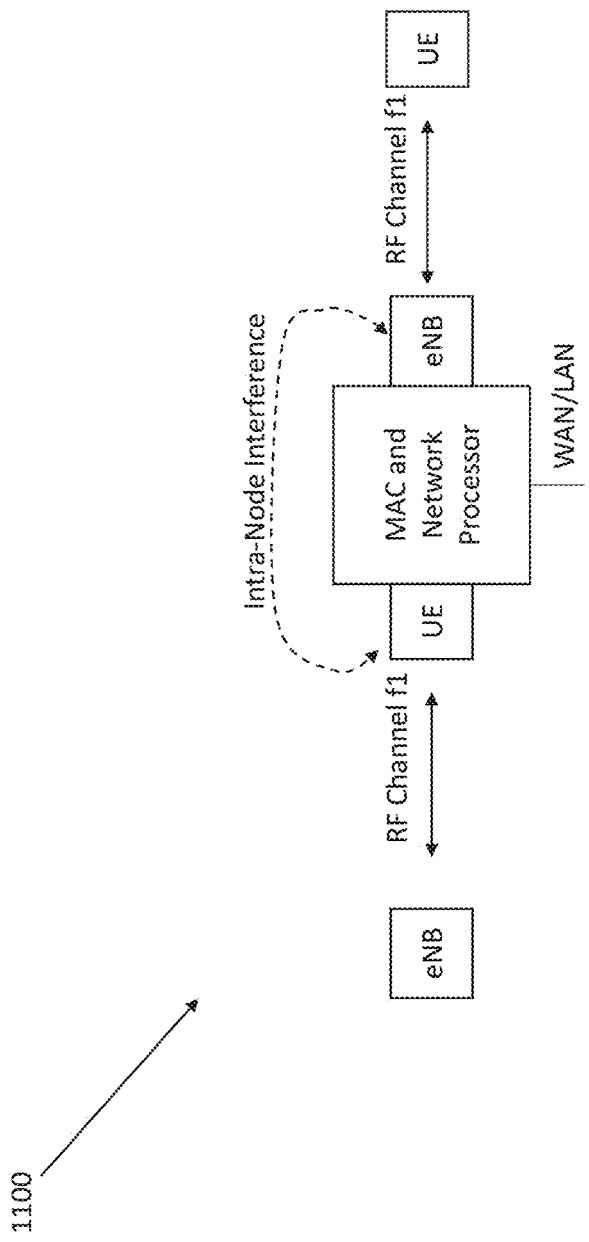
FIG. 11 shows LTE/5GNR Relay architecture, in accordance with the prior art.

FIG. 4C shows a Logic Block Diagram 420, in accordance with the prior art. The Relay Node function as STA and AP. Relay STA function is associated to the higher hierarchy AP, while Relay AP function serves the next hop STA (one or more). Both AP and STA may use the same RF Channel (e.g. f1) or closed RF Channels (e.g. adjacent) in case of dual radio architecture as shown in FIG. 11. Specifically, FIG. 4C shows the conceptual Relay Node topology, which includes communication of the Relay Node with it's parent AP on one side and connecting the child STA on other side. As shown in FIG. 4C although on both sides the Relay Node uses the same frequency channel f1, the present invention and embodiments allow using any adjacent and not frequency channels. Hence, using same frequency channel f1 demonstrates the problem of self-interference (or Intra-Node interference) as presented in FIG. 6 and the present invention solves with other problems.

Figure 6:
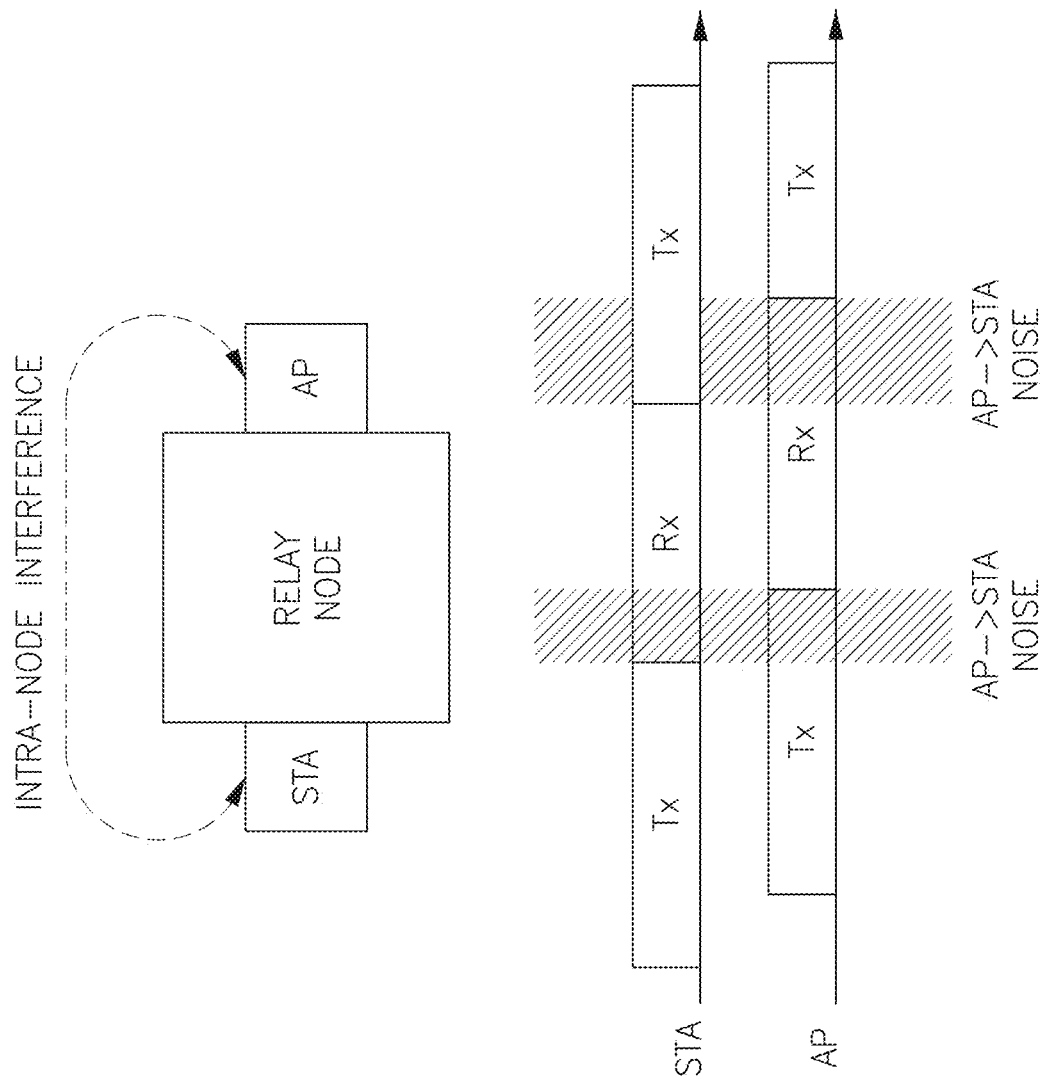
FIG. 6 shows an example of Intra-Node Interference, in accordance with the prior art.

FIG. 4D shows an example of AP and STA functionality 430 in time domain, in accordance with the prior art. Specifically, FIG. 4D shows an example of AP and STA radios within the Relay Node, which transmit and receive signals in different time periods to avoid Intra-Node interference affect as shown in FIG. 6.

Tree-Mesh Cluster

Figure 5:
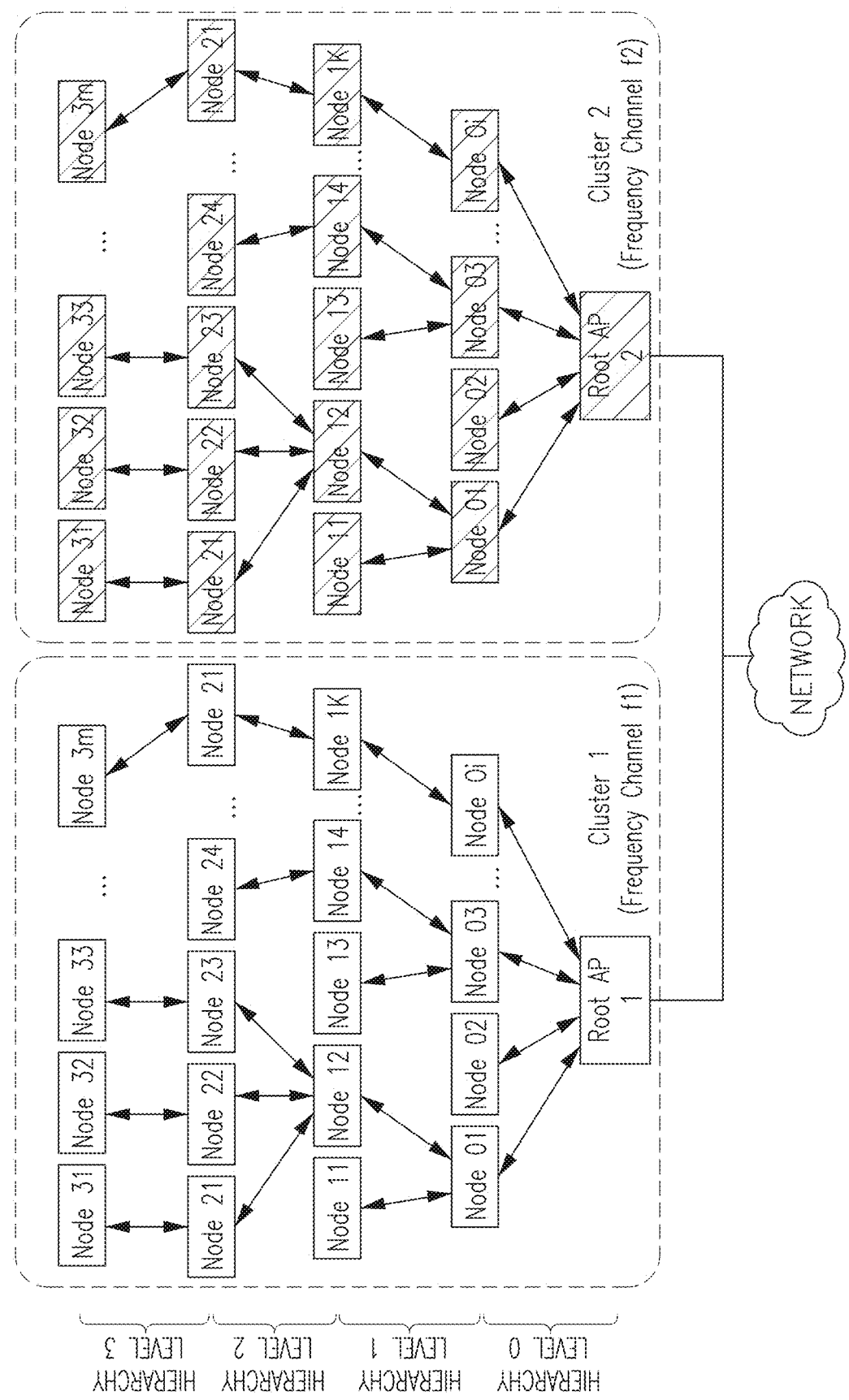
FIG. 5 illustrates a Tree-Mesh Network comprising two Clusters, in accordance with embodiments.

FIG. 5 illustrates an example of Tree-Mesh Network 500 comprising two Clusters 502 and 504, in accordance with embodiments. Each Tree-Mesh Cluster comprises:

Root AP (Root AP 1 and Root AP 2)—which is used as connectivity POP (Point of Presence) to the network. Root AP is the main master for the complete Cluster and as such, it is used as the synchronization distribution entity for all the nodes within the cluster. Root AP of all Cluster is connected to the Network backbone, creating the complete multi-cluster system. Each Cluster has STAs and Relay Nodes creating multi-hierarchical tree-mesh topology (as shown in FIG. 2). Each Cluster shares the same frequency channel or uses closed frequency channels (e.g. adjacent) between the tree-mesh hops, while multiple Clusters may use different frequency channels.

Relay Node—Nodes, within the Cluster, comprising STA and AP functions. STA may function as a slave to connect to Root AP or other Relay APs. AP may function as a local master enabling other Relay Nodes or STA connectivity.

STA—Nodes, which are used as STA only and used as a slave to connect to Root AP or other Relay APs Hierarchical Level—defines the number of wireless hops between the Root AP and the Node within the cluster, e.g. Nodes which are connected to the Root AP directly are considered as Hierarchy Level 0 and next hops are defined as Hierarchy Levels 1, 2, etc.

Single frequency channel is used per each Tree-Mesh Cluster, which is resulted from the Single Radio Relay Node design. In cases where LTE/5G is used, the Relay Node comprises dual-radio architecture, where eNB (E-UTRAN Node B, i.e. LTE or 4G Base Station)/gNB (g Node B, i.e. 5G New Radio Base Station)) and UE (3GPP User Equipment) are accordingly used as different radio modules (as shown in FIG. 11) and therefore such Relay may use the same frequency channel or closed frequency channels (e.g. adjacent). Hence, for both cases (single or dual radio architecture) an inter-node interference effect exists and should be avoided.

As shown in FIG. 4B the Relay Node may use OMNI directional antennas or multi-antenna MIMO modem (e.g. 4, 8 ports). OMNI directional antenna is less efficient for multi-hierarchical mesh topologies, which results in less-controlled interference between the nodes within the Cluster and between the Cluster. Therefore, Relay Nodes with multi-antenna MIMO modem, which supports antenna switching (or beamforming capability) to the desired direction may minimize the interference effect vs. OMNI directional antenna option.

In accordance with embodiments, multi-hierarchical tree topology is used for delivering data traffic between cascading nodes (also called "Relay Node"). The multi-hierarchical tree comprises one or more clusters wherein each cluster comprises a Root Access Point (AP) which is connected to a transport Point of Presence (POP) (e.g. using fiber) in both directions as shown for example in detail with respect to FIG. 2. Each Relay Node comprises STA (Station) which may be connected to the AP of higher hierarchy and an AP which connects the next-hierarchy STAs.

In accordance with embodiments, each cluster comprises a Root AP which is in communication to the backbone network, STAs and Relay Nodes. Each STA can be used as Relay Node within the cluster. The network may comprise single or multiple clusters, while STAs and Relay Nodes may switch between the clusters in case of roaming. Therefore, the network, in accordance with embodiments, may support static or mobile Relay Nodes.

In accordance with embodiments, TDD (Time Division Duplex) radio links methods shown for example in detail with respect to FIG. 3 are used for transmitting the data, since in TDD communication the radio may transmit or receive a signal on the same radio channel not simultaneously.

Additionally, in accordance with some embodiments the methods, systems and devices, include using single-radio Relay Nodes, meaning AP and STA functionalities are running on a single radio-modem entity (as shown for example in detail with respect to FIG. 4B).

The systems devices and methods, according to some embodiments, may be based on various standards for wireless local-area networks, typically the IEEE 802.11 standard for wireless local-area networks as the common functions for most 802.11 based radios allows flexible switching between AP and STA modes. As such, AP and STA in the same Relay Node may use the same frequency channel (as shown for example in FIG. 4B). It is stressed, however, that the systems, devices and methods may be configured for different frequency channels as well.

The systems and methods in accordance with embodiments include the following advantages:

Synchronizing the nodes within the Mesh Cluster to optimize the radio link utilization by reducing the overhead;

Reducing end-to-end latency;

Avoiding intra-node interference (as shown in FIG. 6) between STA and AP within the Relay Node;

Extending the coverage without extending the fixed infrastructure and keeping good Signal to Noise Ratio (SNR) for better modulation rates;

Enabling controlled and optimized roaming within and between the Mesh Clusters

Figure 7A:
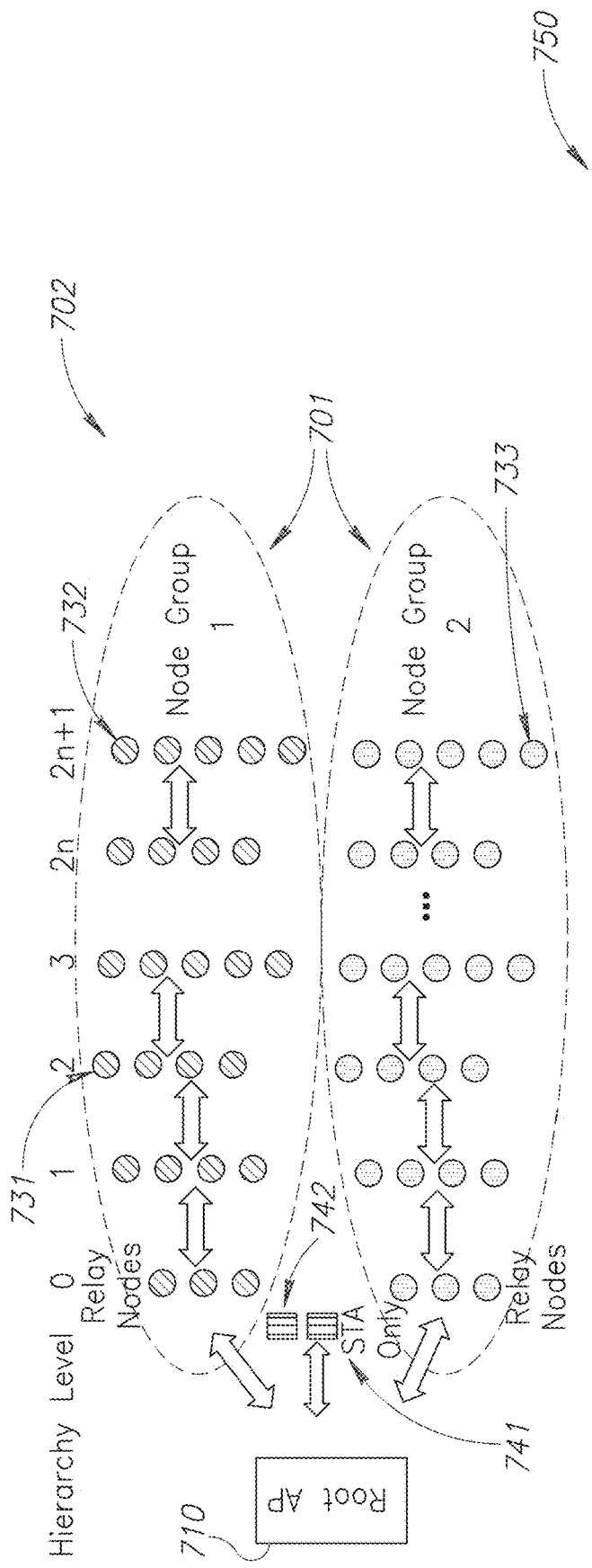
FIG. 7A shows methods and systems for allocating and mapping Framing Slots within a Multi-Frame scheduler for multiple associated Node Groups within a tree-mesh cluster, in accordance with embodiments.

Synchronized Scheduling for Multi-Hierarchical Tree-Mesh Cluster Using One or More Multi-Frames Reference is now made to FIG. 7A which shows methods systems and devices 700 for scheduling a plurality of Framing Slots in one or more Multi-Frames, such as Multi-Frame 750, in a Tree Mesh Cluster 701 of a Tree-Mesh Network such as a synchronized Tree-Mesh Network 702, in accordance with embodiments. FIG. 7B shows a block mapping of the Framing Slots in the Multi-Frame shown in FIG. 7A, in accordance with embodiments.

Specifically, the methods systems and devices comprise scheduling downlink (DL) and uplink (UL) channels in the Tree Mesh network 702, and more specifically for allocating/mapping Framing Slots within the one or more Multi-Frames for multiple associated Node Groups within the Tree-Mesh Cluster 701, in accordance with embodiments.

The Tree-Mesh Network 702 may be for example the Tree-Mesh Network shown in FIG. 5.

In the example shown in FIG. 7A, the Tree-Mesh Network 702 comprises a single cluster 701 which comprises a plurality of Relay Nodes, such as Relay Nodes 731 732 and 733, creating multi-hierarchical tree-mesh topology (as shown in FIG. 2). The Tree-Mesh Network 702 further comprises one or more STAs (such as STA 741 and 742). The Relay Nodes in the hierarchy level 0 and the STAs are in direct communication with a root AP 710.

In accordance with embodiments, the Root AP 710 is responsible for synchronizing the Relay Nodes within the cluster 701 for the Multi-Frame 750 in a way that all Nodes (e.g. Relay Nodes and STA only Nodes) in the hierarchies (e.g. all hierarchies) will be synchronized on the beginning of each Multi-Frame of the one or Multi-Frames and Framing Slot numbering within each Multi-Frame (e.g. Multi-Frame 750).

In operation, the Root AP 710 assigns/allocates a portion of directly associated Nodes (e.g. Relay Nodes in Hierarchy level 0) to different Node Groups such as Node group 1 or Node group 2. Additionally, the Root AP 710 instructs the directly associated Nodes of the Node Group Framing Slot allocation within the Multi-Frame 750.

For example, the tree mesh cluster 701 and related Multi-Frame 710 shown in FIG. 7A are divided, for example by the Root AP 710 into groups as follows:

1) Multiple Node Groups of Relay Nodes (e.g. in FIG. 7A two Node Groups are shown Node Group 1 and Node Group 2); and
2) STA Only Nodes (STAs 741 and 742—no Relays).

In accordance with embodiments, the Root AP 710 is configured and enabled to manage/schedule different Framing Slots Within the Multi-Frame 750, as follows:

Ruled marked Framing Slots (Framing Slot #0):
Allocated as a Maintenance Framing Slot and is used by Root AP for broadcasting the Multi-Frame information within the Cluster 701. The information may include Announcement Message, such as e.g. 802.11 Beacon.
During Framing Slot #0 other Relay Nodes may propagate the Multi-Frame information to the remote nodes within the Cluster.

White colored Framing Slots (Framing Slots #1, 2, 5, 6, 7, 9, 11, 13, 14):
During these time periods the Root AP allocates radio resources for all directly associated Nodes (e.g. Hierarchy 0).
The Relay APs belonging to ODD Hierarchies may, for example simultaneously, communicate with their Associated STAs (e.g. AP[Hierarchy1]<->STA[Hierarchy2]);

Dot marked Framing Slots (e.g. Framing Slots #3, 8, 12):
During this period, Root AP allocates radio resources for associated Node Relays from Node Group 1. Accordingly, for example, simultaneously:
i. Relay Aps of Node Group 1 belonging to ODD Hierarchies may communicate with their Associated STAs (e.g. AP [Hierarchy 1]<->STA [Hierarchy 2])
ii. Relay Aps of Node Group 2 belonging to EVEN Hierarchies may communicate with their Associated STAs (e.g. AP [Hierarchy 2n]<->STA [Hierarchy 2n+1])

Streaks marked Framing Slot (e.g. Framing Slots #4, 10, 15):
During this period Root AP allocates radio resources for associated Node Relays from Node Group 2. Accordingly, for example, simultaneously:
Relay APs of Node Group 2 belonging to ODD Hierarchies may communicate with their Associated STAs (e.g. AP [Hierarchy 1]<->STA [Hierarchy 2])
Relay APs of Node Group 1 belonging to EVEN Hierarchies may communicate with their Associated STAs (e.g. AP [Hierarchy 2n]<->STA [Hierarchy 2n+1])

In some embodiments, Node STAs (which are not Relays) connected to the Root AP may communicate during all Framing Slots and should not be part of any Node Group.

It is stressed that the scheduling methods structure in accordance with embodiments are not limited to the specific example shown in FIG. 7A and may support any number of Node Groups and any number or structure of Nodes per Node Groups and Framing Slots allocation.

Framing Slot Basis
Procedures for Tree-Mesh Synchronized Scheduling

Figure 8:
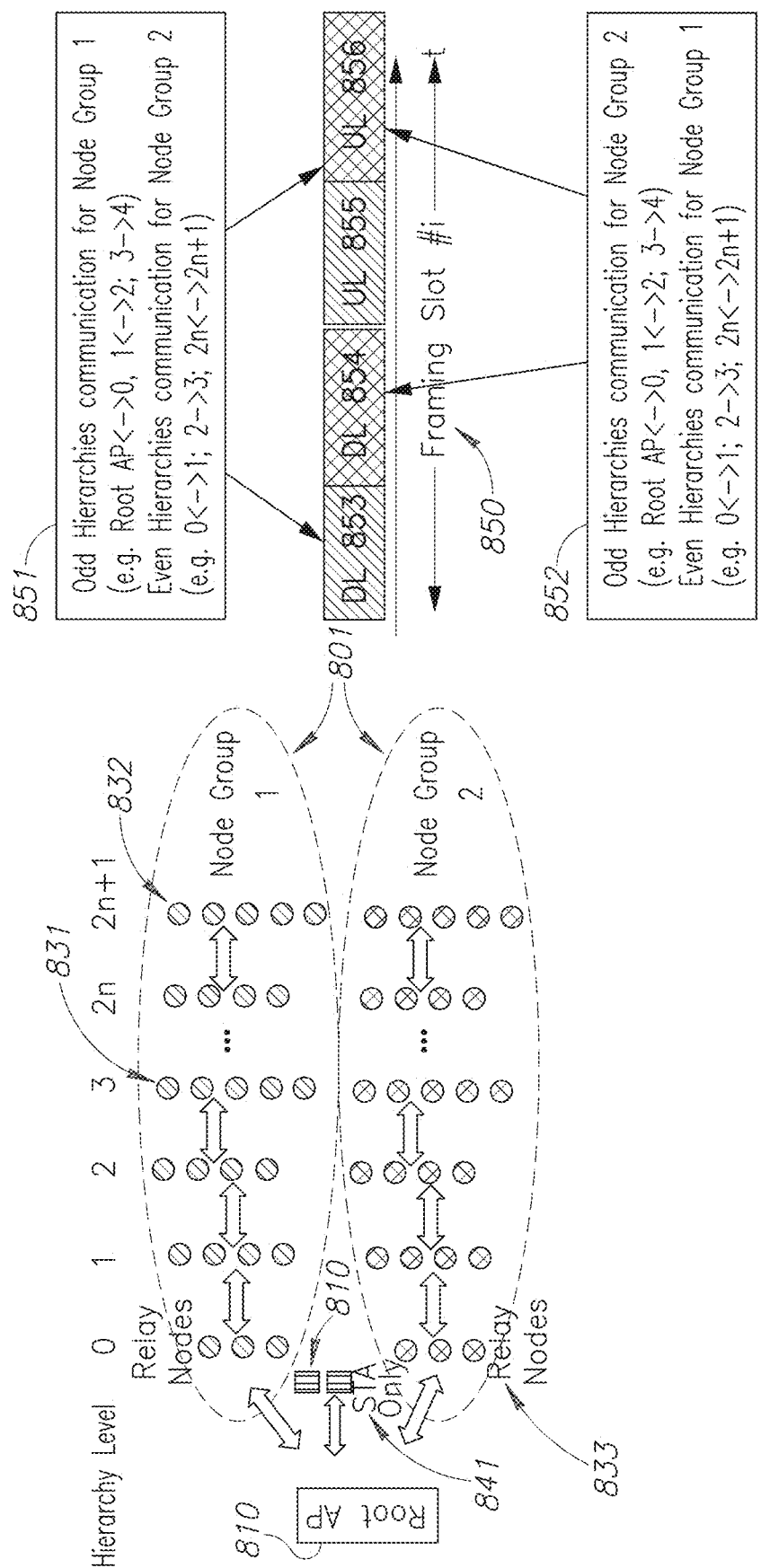
FIG. 8 shows a Tree Mesh Cluster Scheduling method using Framing Slot Time Division, in accordance with embodiments.

Reference is now made to FIG. 8 which show systems methods and devices 800 for Tree Mesh Cluster 801 scheduling in a Tree-Mesh Network 802, based on Framing Slot Time Division such as Time Division of Framing Slot 850, in accordance with embodiments. Specifically, the method includes allocating DL and UL transmission periods which are divided into time blocks (e.g. two DL Blocks—853, 854 and two UL blocks 855, 856).

Hence, while FIG. 7A shows methods and systems for scheduling/allocating resources based on separately allocating resources for each Framing Slot in a Multi Frame, FIG. 8 shows methods for scheduling/allocating resources based on separately allocating resources in a Framing Slot.

In accordance with embodiments, the DL and UL direction in Framing Slot 850 includes multiple transmission time-zones. Each time-zone can be used for one of the Node Groups or by Root AP to serve some or all associated STAs. Specifically, FIG. 8 shows an example where the first time-zone within the Framing Slot 850 used for DL and UL transmissions is allocated for AP 810 to serve all associated STAs and the other time-zone is used for one of the Node Groups.

For example, the diagonal lined marked DL blocks (block 853) and UL blocks (block 855) are used by Root AP for allocating radio resources for associated Node Relays from Node Group 1 (e.g. Rely Nodes 831 or 832). Accordingly, for example, simultaneously:
Relay APs of Node Group 1 belonging to ODD Hierarchies may communicate with their Associated STAs (e.g. Root AP [Hierarchy 1]<->STA [Hierarchy 2]) on the same DL and UL Blocks
Relay APs of Node Group 2 belonging to EVEN Hierarchies may communicate with their Associated STAs (e.g. AP [Hierarchy 2n]<->STA [Hierarchy 2n+1]) on the same DL and UL Blocks The square marked DL (block 854) and UL block (block 856) are used by Root AP to allocate radio resources for associated Node Relays from Node Group 2 (e.g. Relay Node 833). Accordingly, for example, simultaneously:

Relay APs of Node Group 2 belonging to ODD Hierarchies may communicate with their Associated STAs (e.g. AP [Hierarchy 1]<->STA [Hierarchy 2]) on the same DL and UL Blocks Relay APs of Node Group 1 belonging to EVEN Hierarchies may communicate with their Associated STAs (e.g. AP [Hierarchy 2n]<->STA [Hierarchy 2n+1]) on the same DL and UL Blocks In some cases, the scheduling/allocating resources methods may be based on separately allocating resources for each Framing Slot and in a Framing Slot (e.g. combing the scheduling methods illustrated in FIG. 7A and FIG. 8).

Updating the Root AP and the Cluster with the New Node

In accordance with further embodiments, there are provided methods for updating the Root AP with a new Node which wishes to join the Cluster. The new Node may function as STA only or Relay Node with attached Nodes behind.

Updating the Root AP and the Cluster on a Roaming Node

In accordance with further embodiments, there are provided methods systems and devices for updating the Root AP on a roaming Node that wishes to join the Cluster, for example, as a result of roaming from other Cluster(s) or within the Cluster. The method includes updating the hierarchy and new association of existing Nodes within the cluster. Specifically, it includes updating the new AP (e.g. Root or Relay), that the existing Node changed its association within the Cluster (resulted from the roaming event).

Figure 9:
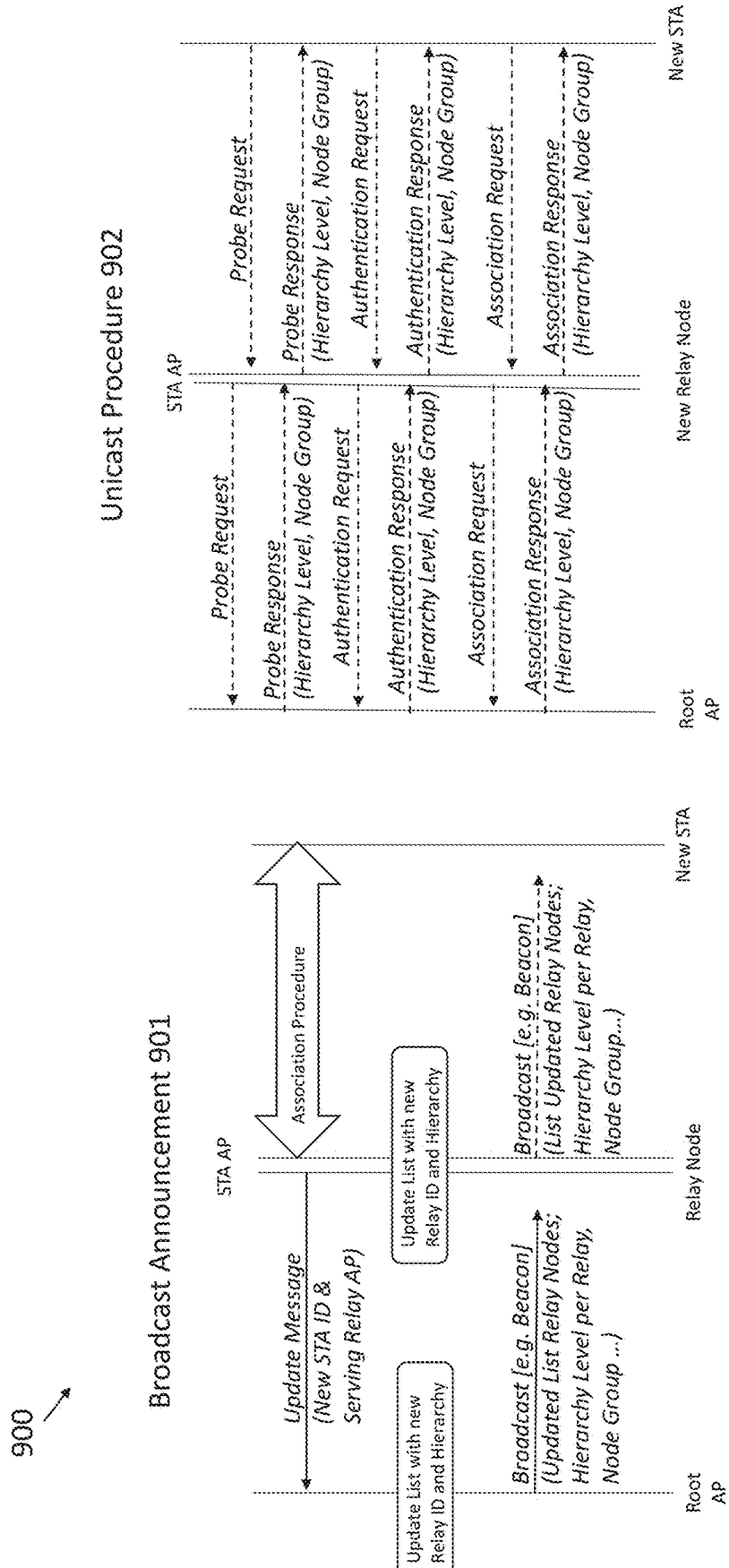
FIG. 9 shows hierarchy level updating method, in accordance with embodiments of the present invention.

FIG. 9 further illustrates hierarchy Level Update procedures 900 for updating for example Root AP with the new Node, in accordance with embodiments.

In operation, a New Node, which is Node STA, may decide to connect to one of the Relay Node AP or Root AP after completing the scanning process. Once the New Node is connected, the Serving AP (Relay or Root) updates the New Node on the Hierarchy Level and accordingly the New Node is updated with its own ID and capabilities (e.g. STA only or Relay Node).

In case the Roaming Node is a Relay Node with Nodes behind (behind meaning that Relay Node has its own Childs/STA connected as a result of the roaming, in cases of new entry process, it is not possible to have any connected devices behind the New STA/Relay), then the Roaming Node updates all connected Relay Nodes IDs and their new Hierarchy Level. The update messages are propagated over the Relay Nodes in the Tree-Mesh Cluster toward the Root AP. In accordance with embodiments, the Roaming Relay Node updates all Nodes behind it, e.g. the New Relay Node updates its associated STAs (and Relays) with a new Hierarchy Level, as it changed the location within the Cluster or roamed from other Cluster with their new Hierarchy Levels within the Cluster and accordingly all nodes are synchronized to the Multi-Frame and get the Cluster broadcast information through the broadcast announcement (e.g. Beacon) in the Maintenance Framing Slot. In other words, as the whole network is synchronized according to the Multi-Frame timing, the Nodes behind the New Relay are updated with their new Hierarchy and other essential information from the Broadcast message sent during Maintenance Framing Slot.

In other words, as the network is synchronized according to the Multi-Frame timing, the Nodes behind the New Relay are updated with their new Hierarchy and other essential information from the Broadcast message sent during Maintenance Framing Slot.

At the end of the updating process, the Root AP and all Nodes of the Cluster are aware of the changes resulting from the New Node entry.

Node Disconnected from the Cluster

In accordance with embodiments, in cases where a Node is disconnected from the Cluster, the Serving Node AP (Relay or Root), to which the Node was connected, should propagate the change toward Root AP. Accordingly Root AP updates the Tree Mesh Cluster. This procedure is mostly relevant for Relay Nodes, but the present invention is not limited to any Node within the cluster.

Cluster Identification

In accordance with embodiments, the Cluster has common identification (ID), meaning that the Nodes (e.g. all Node)s within the Cluster have the same ID.

In some cases, for 802.11 networks, service set identifier (SSID) can be used as a common cluster ID. SSID can be shared also with multiple Clusters within the same network.

In some cases, a unique ID may be used per each Cluster as well.

In some cases, each Node AP (Root or Relay) includes also its own ID. For 802.11 networks Basic Service Set Identifier (BSSID) can be used as unique ID per each Node AP.

In accordance with embodiments the procedures of updating the Root AP and the Cluster with the new Node/Roaming Node and disconnected Node may use the Hierarchy Level distribution procedure.

Hierarchy Level Distribution Procedure

FIG. 9 shows hierarchy level updating method 900, in accordance with embodiments. Method 900 comprises updating Each Node connected to the specific Cluster with the Hierarchy Level. Hierarchy Level update is required so any new Relay STA will get the right scheduling allocation per Node Group. The update procedure may be done by different methods as follows:

Broadcast Announcement Procedure 901—As shown in FIG. 9, any New STA (relevant for Relay Node) executes Association Procedure (according to known industrial standards such as: 3GPP, IEEE 802.11 etc.). As a result, the serving Relay Node updates the Root AP with an Update Message, which is sent through Relay Nodes (e.g. all Relay Nodes) within the Cluster. The Relay Nodes and Root AP update their list of Relay IDs and their Hierarchy Level. The next Broadcast Message is distributed by Root AP and optionally propagated by Relay APs within the Cluster with updated Relay List Nodes, which includes Hierarchy Level & Node Group per each Relay Node within the Cluster. For 802.11 systems new parameter, which announces the Hierarchy Level in the Beacon message may be used.

Unicast Procedure 902—As shown in FIG. 9, the New STA executes Association Procedure. The information about the specific Hierarchy Level and Node Group is sent as unicast in one or more Response Messages. For 802.11 systems new parameter, which announces the Hierarchy Level by the AP within one of the 802.11 association messages (e.g. Probe Response, Authentication Response, Association Response). Such Hierarchy Level information delivery is relevant for Node STA new network entry process as well as roaming process between APs within the cluster or between the clusters.

Figure 10:
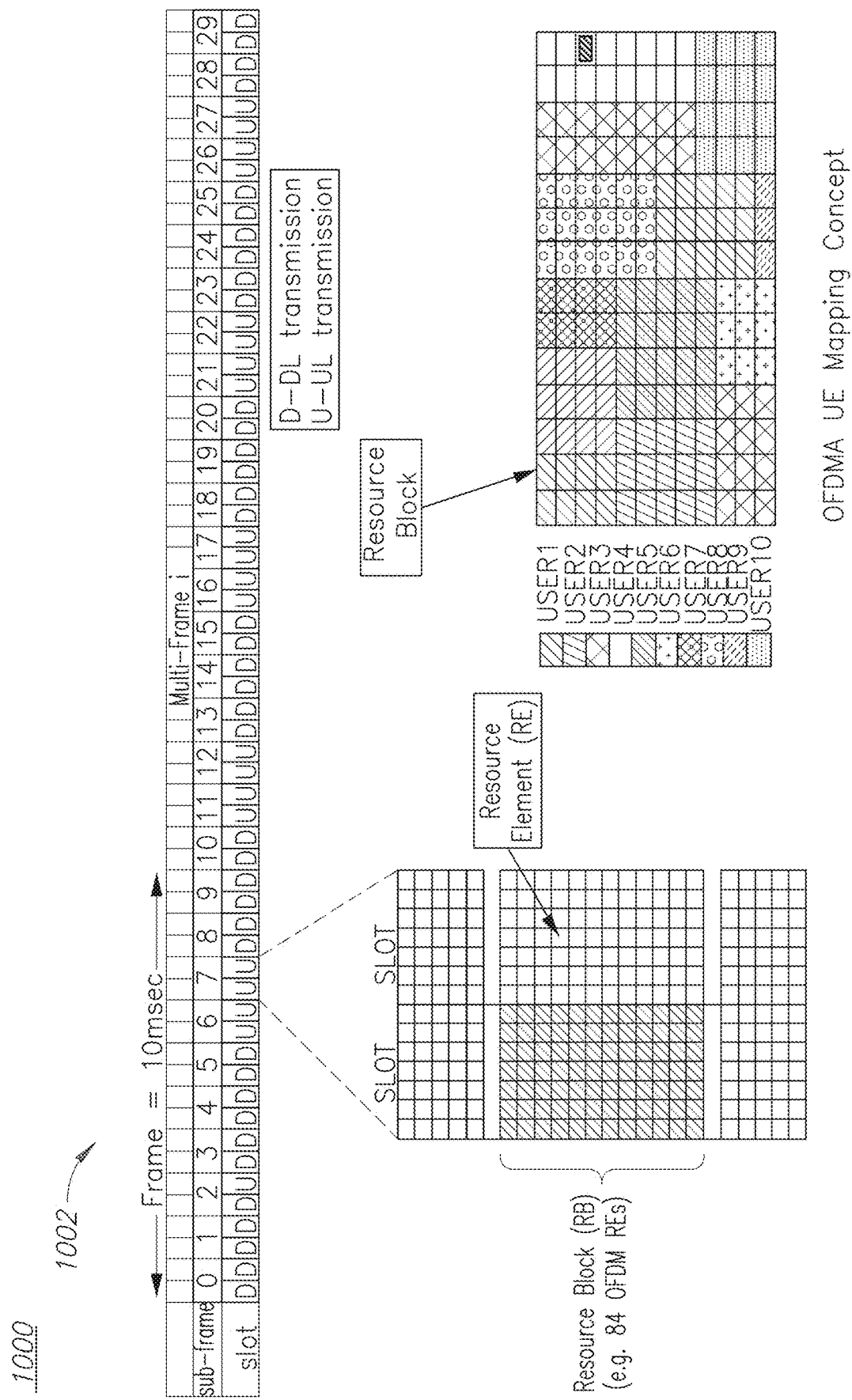
FIG. 10 shows an LTE Framing Structure, in accordance with embodiments of the present invention.

FIG. 10 shows an LTE Framing Structure 1000, which may be used by the present invention methods and systems as shown for example in FIG. 7A or FIG. 8 for Tree Mesh Cluster Scheduling in a Tree-Mesh Network, in accordance with embodiments.

The LTE Framing Structure 1000 comprises a Multi-Frame 1002, which may comprise for example 30 sub-frames and accordingly 60 slots. Within the Multi-Frame 1002 each sub-frame is numbered. It is stressed that any numbering method may be used and accordingly any number of sub-frames per Multi-Frame may be used.

In accordance with embodiments, each slot has multiple RBs (Resource Blocks as defined in 3GPP) and each RB or set of RBs and multiple slots can be allocated per UE enabling very flexible OFDMA UE allocation.

For TDD communication each Sub-Frame or slot can be used for DL or UL transmission. As LTE and 5G NR has different DL and UL profiles, where 5G NR is much more flexible, still the present invention may be utilized for any profile flexibility.

The number of DL and UL sub-frames or slots or symbols per frame (e.g. 10 msec) defines the relation between DL and UL, which is equivalent for TDD DL:UL split ratio. In a fully synchronized network, all eNBs and UEs use the same TDD split and the same DL and UL transmission slots to minimize interference within the radio network.

In LTE/5G wireless systems typically two different modems are used for gNB and UE sides. However, the present invention is relevant for LTE/5G since even with two radios self-interference cancellation is required when using the same RF channel or closed RF channels (e.g. adjacent).

As shown in FIG. 11, LTE/5G NR Relay architecture 1100 includes a UE model which is connected to higher hierarchy eNB and eNB module, which serves the next hierarchy UEs. MAC and Network Processor Module is used to coordinate between UE and eNB module. In addition, MAC and Network Processor Module is responsible for forwarding the packets, enabling protocol control functions of MAC and high layers as defined by 3GPP. An example for 3GPP Relay Node is IAB (Integrated Access-Backhaul) units, which includes UE and eNB function within the same network location. Such IAB enables link extension using chain configuration.

Advantageously, the present invention enables IAB units to establish flexible tree-mesh topologies using a single channel or limited number of overlapping channels and avoiding Intra-Node Interference effect.

Figure 12:
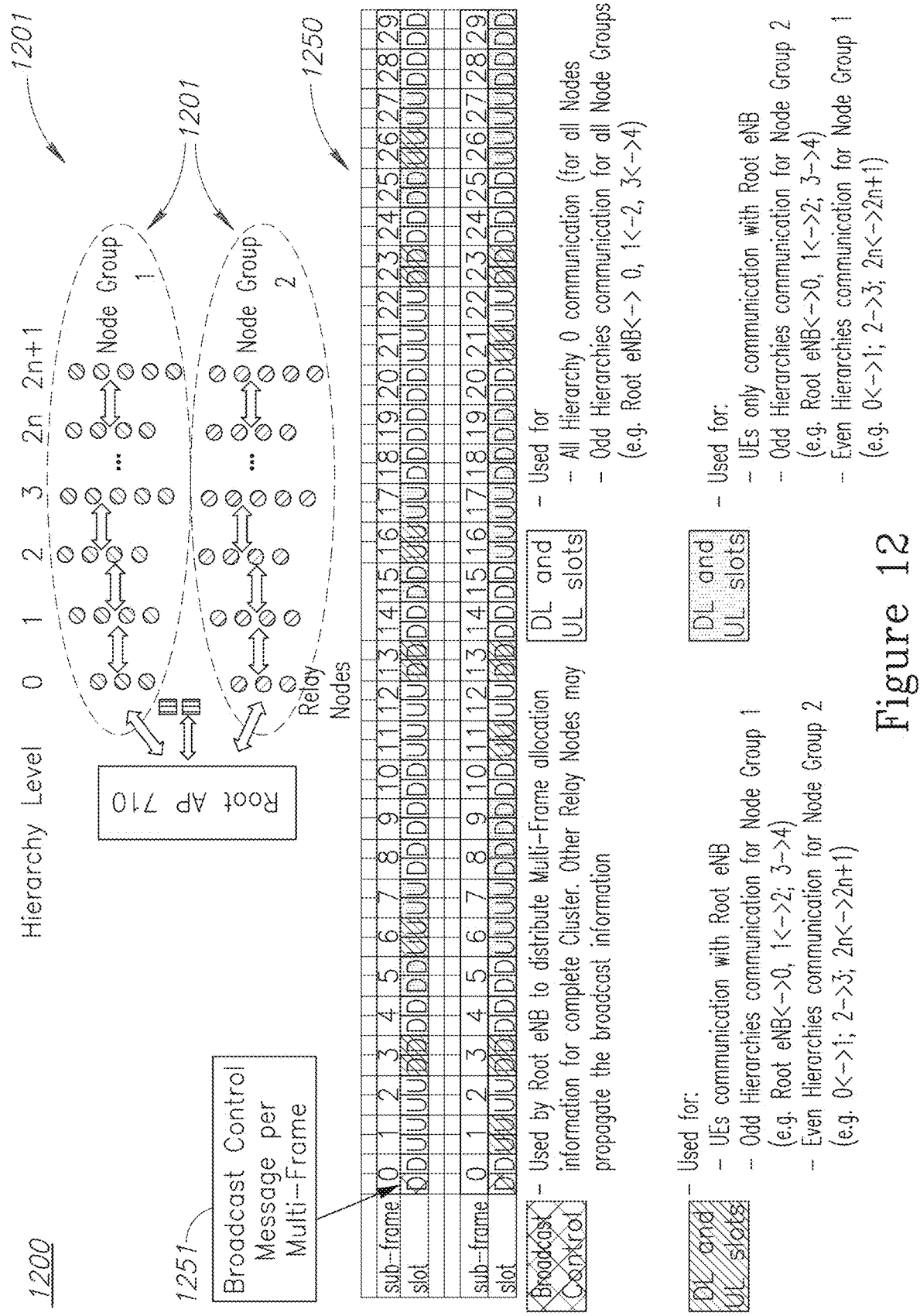
FIG. 12 shows a Tree Mesh Cluster Scheduling based on LTE/5GNR Multi-Frame structure, in accordance with embodiments.

FIG. 12 shows an example of a tree-mesh Relay Node Groups mapping 1200 of DL and UL slots using LTE Multi-Frame structure 1250 to enable different Relay Nodes in Tree Mesh Cluster 1201 to communicate with each other for different Hierarchical Levels and avoiding intra-node interference, in accordance with embodiments. While FIG. 7A shows an example of 802.11 synchronized framing approach FIG. 12 shows a similar concept using LTE structure, both in accordance with embodiments.

As shown in FIG. 12 the Multi-Frame 1250 includes using one of the slots such as the first Slot 1251 to send information about the Node Group mapping structure per one or more Multi-Frames. The slot, which holds the broadcast information may be used for regular DL transmission (e.g. where regular DL transmission means 'no maintenance' but rather regular data packet to the associated UEs/Relay). It is considered, that Broadcast information is not big enough and therefore remained resources can be used for regular communication similarly "white slots") as well in other RBs (if available) to all Hierarchy 0 nodes/UEs. Broadcast information can be avoided per Multi-Frame if no change Relay Node Group allocations in the following Multi-Frame.

It is stressed that while FIG. 12 shows an example using two Node Groups any number of Node Groups may be used such as three, four and more.

It is stressed that the description in the present invention refers to a Multi-Frame using 16 Framing Slots with 2 msec per Framing Slot such as in 802.11. However, the invention is not limited to the specific number and Framing slot duration within the Framing Slot or specific wireless standard and system. In addition, the invention description refers to 802.11 OFDMA-based technology, but not limited to OFDMA provided frequency and time domain wireless resource allocation flexibility between AP and associated STAs, which is very efficient for PTMP (Point-To-Multi-Point) communication topologies. This invention has the advantage of using OFDMA, but also may use other wireless methods; e.g. OFDM/TDMA in case it is structured as Multi-Frame (as shown in FIG. 2)

This invention is relevant also for other synchronized framed schedulers as used in WiMAX, LTE, 5GNR and other future synchronized PTMP communication methods (e.g. future 3GPP Releases). This text explains how the grouping approach as described in this invention can be applied on TDD LTE and 5GNR implementations. Certainly, this invention also can be relevant for any future wireless technologies if synchronized frames structure is used.

As shown in FIG. 10 the LTE & 5GNR PHY structure consists of 1 ms sub-frame, while 10 sub-frames formats 10 msec frame. Such frame in LTE & 5G is used for periodic PHY procedures as defined by 3GPP. Each frame consists of multiple slots, while a number of slots depends on the numerology as defined in 5GNR. As per FIG. 10, the example in the detailed description refers to LTE PHY structure case. LTE includes only one numerology of two slots per sub-frame of 1 msec and each slot has 7 OFDM symbols in time (NOTE: 5GNR has some differences in terminologies and number of symbols, but for this invention the approach of grouping is similar). The OFDMA structure of LTE & 5G is based on Resource Blocks (RBs), where each RB can be allocated per UE (User Equipment—equivalent to STA in 802.11). Each RB is constructed from 12 subcarriers and 7 symbols (slot in LTE). If referring to LTE TDD structure some sub-frames may be used for DL transmission and others for UL, in 5GNR DL and UL transmissions can be done per symbol basis (based on 3GPP profile).

A detailed description of other type of schedulers and scheduling methods that may be used in accordance with embodiments are illustrated in FIG. 13, FIG. 14, FIG. 15, FIG. 16, FIG. 17. Specifically, FIG. 13, FIG. 14, FIG. 15, FIG. 16, FIG. 17 show examples of Framing Slot and Multi-Frame Synchronized structure for 802.11 OFDMA as illustrated by the current applicant U.S. Provisional Application Ser. No. 63/246,863 filed on Sep. 22, 2021, entitled "SYNCHRONIZED FRAMING SCHEDULER METHODS AND SYSTEMS FOR OFDMA BASED WIRELESS SYSTEMS" which is incorporated herein by reference in its entirety and which may be used as a reference for 802.11 system Tree Mesh scheduling in accordance with the present invention and embodiments.

Figure 13:
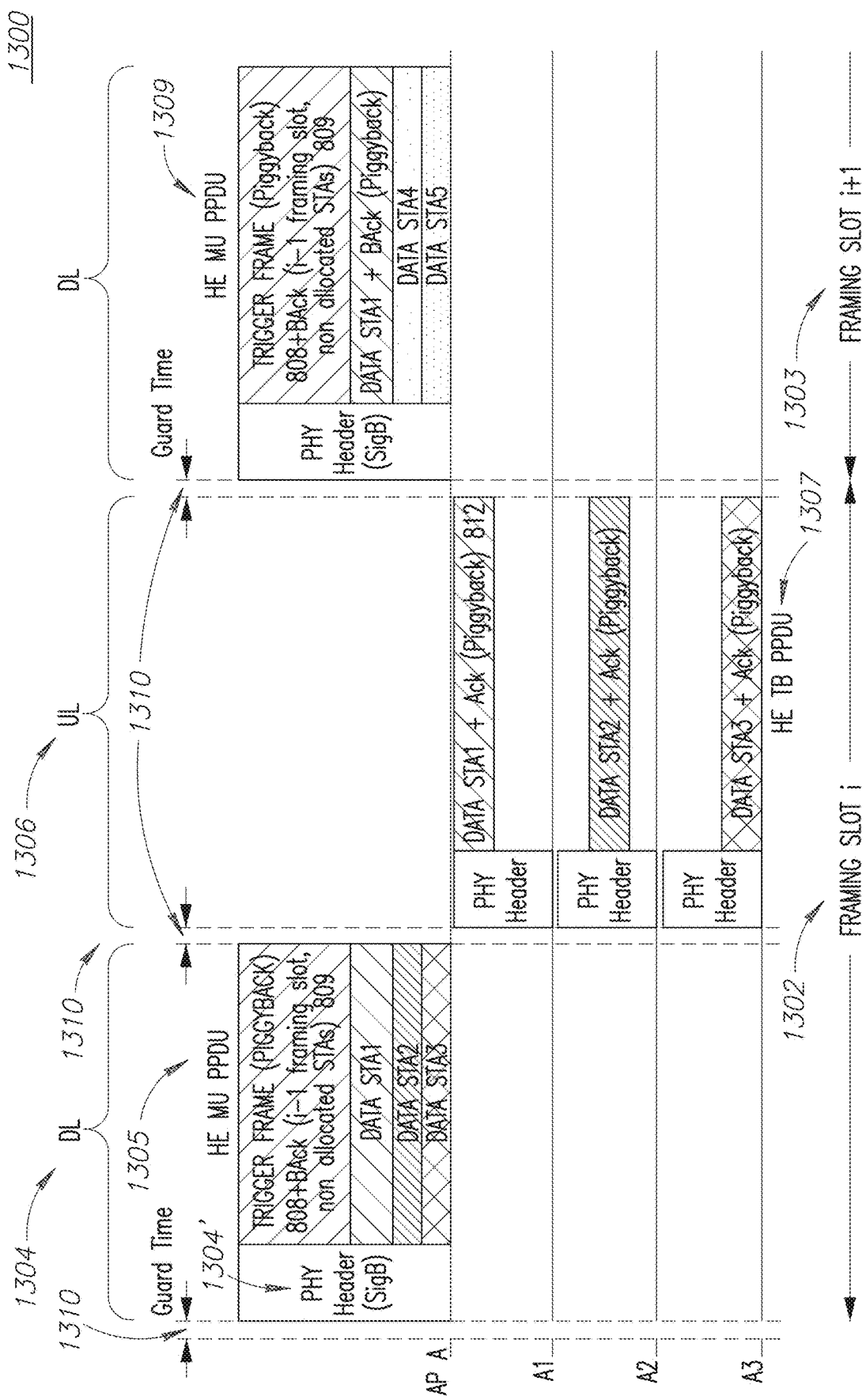

FIG. 13 shows a Framing Slot structure and scheduling method and system 1300 for OFDMA based wireless systems such as IEEE 802.11 standard, in accordance with embodiments.

As shown in FIG. 13, each network may comprise an access point (AP) and a plurality of stations (e.g. STAs A1, A2 . . . An) in 802.11 OFDMA wireless communication system.

In accordance with embodiments, the AP synchronizes the plurality of STAs within each network using one or more synchronization signals over the air (e.g. using Timestamps) delivered between the AP and the STAs.

The method includes allocating one or more Framing Slots, such as Framing Slot 1302 and Framing Slot 1303. Each Framing Slot (e.g. Framing Slot i, Framing Slot i+1 . . . ), comprises a fixed time duration (e.g. 2 msec).

In some cases, the Framing Slot's time duration may vary per traffic characteristics (e.g. latency, throughput, etc.).

In accordance with embodiments, each Framing Slot such as Framing Slot 1302 comprises DL and UL transmission periods 1304 and 1306. Per each Framing Slot, the AP (e.g. AP A) may transmit datagrams (e.g. Data STA1, Data STA A2, Data STA3) to multiple STAs (e.g. A1, A2, A3) using for example one or more Data Units such as Data Units 1305 (e.g. HE MU-PPDU 802.11 frame) in the DL direction.

The Framing Slot structure, further defines, in accordance with embodiments, a piggyback mechanism, where part of RUs is used for Trigger Frame 1308 for UL RU allocation and part of RUs is used for Block Ack messages 1309 for previous Framing Slots for non-allocated STAs (e.g. STA 4 and 5).

As shown in FIG. 13, each Framing Slot is numbered 0, 1, . . . i, i+1 and Guard Time intervals 810 are included between each DL and UL transmission to compensate on the two-way signal propagation time over the air between AP and associated STAs.

In accordance with embodiments, the defined allocations, such as Framing Slot 802, include a number of time slots in which each time slot is scheduled as follows:
  DL (downlink) transmission period 1304—transmitted BS/AP A and received by STAs A1, A2 . . . An;
  UL (uplink) transmission period 1306—transmitted by STAs A1, A2, . . . An and received by BS/AP A;
  Guard Periods 1310 between DL and UL transmissions.

In accordance with embodiments, the DL and UL transmission periods 1304 and 1306 included in the Framing Slot may have different time durations and the duration ratio between them defines TDD split. Advantageously, by using different DL and UL durations the network system may provide DL and UL or symmetric oriented services. In other words, the synchronized scheduling method and system in accordance with embodiments provide managed DL and UL with continuous behavior, hence, bursts (such as Data Units 1305 and 1307) are transmitted continually one burst following the previous burst, while prior 802.11 schedulers provide opportunistic (e.g. not managed and not continuous) DL and UL scheduling transmissions opportunities.

Specifically, the framing structure as described in accordance with embodiments includes one or more DL transmission bursts such as DL Data Unit 1305 (e.g. HE MU-PPDU) during the fixed-time DL period 804 and UL transmission bursts such as UL Data Unit 1307 (e.g. HE TB PPDU) during fixed-time UL period 1306.

In the DL transmission period 1304, the first burst is transmitted by AP at the beginning of each Framing Slot. If more than one DL burst is transmitted during the DL period (as illustrated for example in FIG. 10) the following DL bursts are transmitted with a time offset from the beginning of the Framing Slot as per AP scheduling decision. The total time for all DL bursts transmissions will not exceed the fixed-time DL period 1304.

Figure 14:
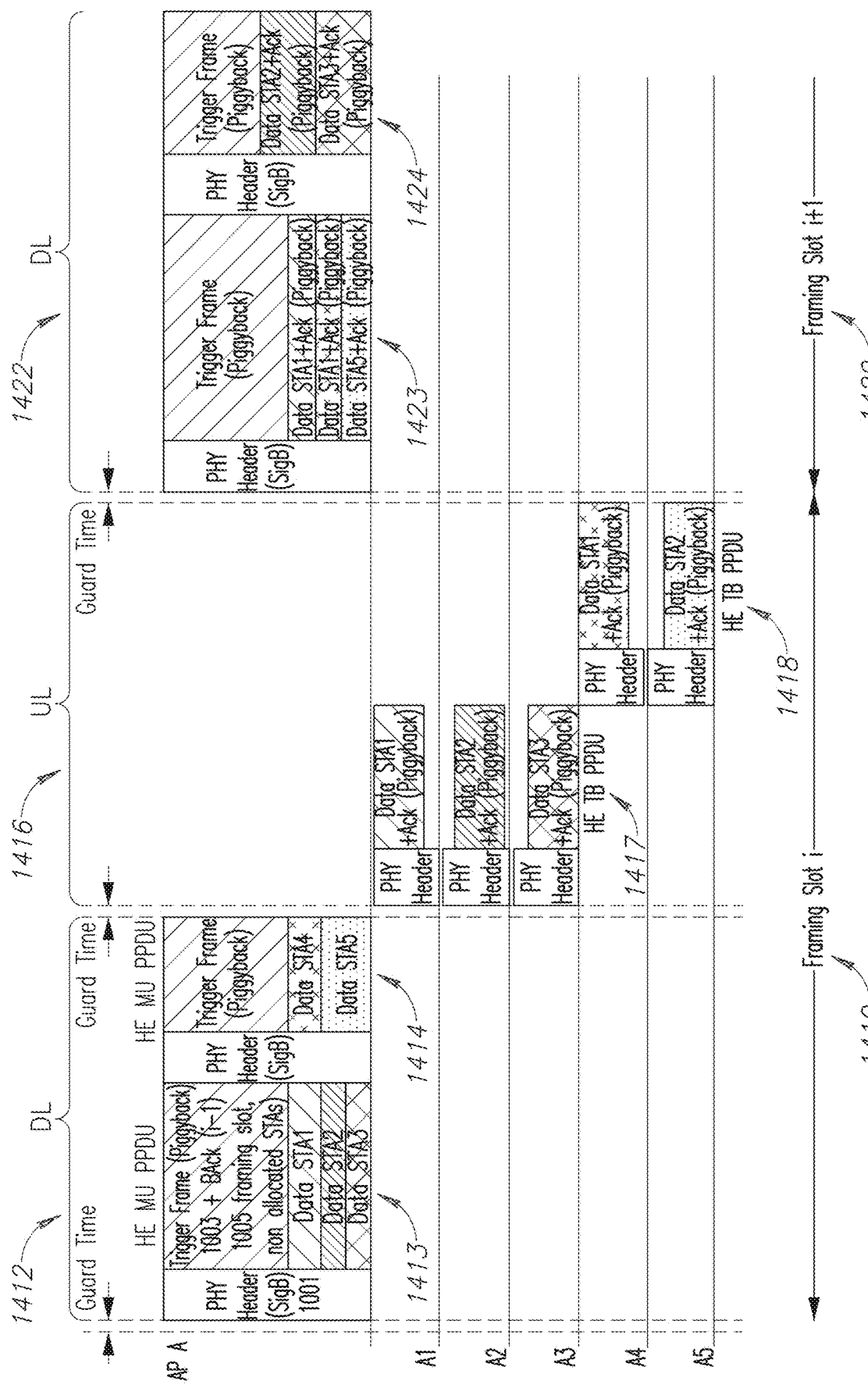

In the UL transmission period 1306, the STAs transmit to the AP a first burst (Data Unit 807 such as HE TB PPDU) at the beginning of the UL period within the Framing Slot 1302. If more than one UL burst is transmitted by another set of STAs within the UL period of the Framing Slot (as illustrated in FIG. 14), these bursts should be transmitted with time-offset from the beginning of the UL period as indicated by AP to the STAs during the DL period. The total time for all UL bursts transmissions will not exceed the fixed-time UL period.

In accordance with embodiments, within the continuous synchronized behavior of the scheduling, the fixed-time Framing Slots are transmitted constantly, while AP and STAs are completely synchronized one with the other on the same transmission timings, transmission durations and numbering sequence of the Framing Slots.

More specifically, as illustrated in FIG. 13 a set of functionalities per each Framing Slot are defined as follows, in accordance with embodiments:
  DL resource scheduling—the DL RU allocations for the associated STAs are signaled by BS/AP A in the SigB field, which is included for example in the PHY header 1304' of data unit 1305 (HE MU-PPDU according for example to 802.1 lax amendment protocol).
  UL resources scheduling—the BS/AP A informs the STAs with RU allocation in UL direction using Trigger Framing message 1308 (for example according to 802.1 lax amendment). The Trigger Frame is transmitted by BS/AP A as a broadcast/multicast message in one or more of DL Resource Units (RU). The Trigger Frame includes an instruction to some or all STAs served in DL direction to enable Acknowledgement and UL data transmission, but also instructions to any STA associated to the AP/BS A for data transmission.
  Acknowledgment for DL transmission—each DL transmission to STAs is acknowledged in the UL transmission of the same Framing Slot. In some cases, STAs use ACK and/or Block Ack messages such as ACK message 1312 (according to 802.1 lax amendment)
  Acknowledgment for UL transmission—each UL transmission is acknowledged by BS/AP A in the DL transmission of the next Framing Slot. BS/AP uses ACK and/or Block Ack message (according to 802.1 lax amendment). In some cases, the ACK and/or Block Ack messages are sent as broadcast/multicast in one of the Resource Units (RU) and in addition, the ACK/Block Ack messages can be sent in a unicast Resource Unit (RU) as a piggyback message with other data (as shown in FIG. 13).

UL Random access—Each Framing Slot may enable UL Random access for other STAs also using the Trigger Frame. Such capability is enabled using UORA (Uplink OFDMA Random Access) mechanism according to 802.1 lax. As shown in FIG. 13 the time duration of the DL and UL bursts transmissions are fixed time periods comprising fixed time guard between the Framing Slots in each Framing Slot.

In accordance with embodiments, the Framing Slots are transmitted constantly one after another creating continuous synchronized communication between AP and STAs. Each Framing Slot is numbered with a time stamp, and AP and STAs are updated on each Framing Slot timing and sequence number.

A Group of Framing Slots generates a Multi-Frame as explained hereinafter with respect to FIG. 15A, FIG. 15B and FIG. 15C

In accordance with embodiments, each Framing Slot may support one or more Data Units (e.g. PPDU frames) per each DL transmission and each UL transmission. While FIG. 13 shows an example of a single Data Unit (e.g. PPDU frame) per DL transmission and UL transmission (for explanation simplicity), FIG. 14 shows an example including two Data Units in DL and two Data Units in UL per Framing Slot. The number and duration of Data Units in DL and UL slots can vary as long as the total time duration of data units is not exceeding the DL and UL time duration as set by TDD split in the system.

Specifically, as shown in FIG. 14, the systems and methods in accordance with embodiments may define scheduling methods and systems configured and enabled for transmitting/receiving multiple Data Units (such as 802.11ax HE MU-PPDU) per Framing Slot in each DL and UL directions.

For example, a number of Framing Slots, such as Framing Slot 1410 and Framing Slot 1420 having a fixed time duration may be allocated. Each Framing Slot such as Framing Slot 1410 includes a DL transmission period 1412 and UL transmission period 1416. In accordance with embodiments, the DL transmission period 1412 and UL transmission period 1416 comprise respectively one or more DL Data Unit bursts and one or more UL Data Unit bursts such as DL Data Unit bursts 1413 and 1414 (e.g. HE MU PPDU) and UL Data unit bursts 1417 and 1418 (e.g. HE TB PPDU).

In accordance with embodiments, each Data Unit Burst may have a different time length based on the AP scheduling decision, but the total time length of all transmission bursts cannot exceed the fixed DL period time. Additionally, in accordance with embodiments, different Data Units may allocate RU to a different set of Data Units, and/or the same STAs may belong to a different set of STAs. For example, STA1 may be in the first Data Unit 1413 and also in the second Data Unit 1014.

In accordance with embodiments, in operation AP, such AP A, transmits one or more DL Data Unit bursts (Data Units 1413 and 1414) to one or more STAs (STA1, STA2, STA3, TA4 and STA5) during DL transmission period 1412. Each DL Data Unit burst comprises:
PHY header such as header 1401 comprising scheduling instructions to allocate one or more (for example a set) of RUs (Resource Units) to one or more STAs such as predefined STAs;
MAC and Data are allocated in the assigned RUs per set of STAs as indicated in the PHY header of Data Units;
Trigger Frame 1403 (such as 802.11 Trigger Frame) included in one or more Data Units bursts during DL transmission. The Trigger Frame includes UL transmission instructions to STAs during the Framing Slot (the instructions are detailed below with respect to the UL transmission period). In accordance with embodiments, the AP (such as AP A) may send one or more Trigger Frames within Data Units according to the Quality Of Service scheduling decision (e.g. resulting from strict latency requirements). It is noted that the trigger frame may be allocated in any RU.
802.11 Block Ack (Block Ack 1405) or Ack information is included in one or more DL Data Units bursts during DL transmission. Block Ack or Ack information is sent to indicate STAs for the reception of UL data transmission during the previous Framing Slot.

Accordingly, STAs, which are communicating with AP (Such AP A) and which received UL transmission instructions in Trigger Frame during the DL transmission period send UL Data Unit Bursts 1417 and 1418 (such as 802.1 lax HE TB-PPDU) during the UL transmission period (e.g. UL transmission period 1416) as allocated in accordance with embodiments, as follows:
Each UL transmission period (e.g. UL transmission period 1416) may include one or more Data Unit bursts (e.g. TB-PPDU transmission periods) such as Data Unit bursts 1417 and 1418. AP may instruct the STAs to transmit their Data Units (TB-PPDU) in designated time during the UL transmission period.
The complete time length of all related UL Data Units bursts transmissions with different timings do not exceed the total UL transmission period.
Each UL Data Unit burst comprises:
DL Trigger Frame information comprising a PHY header instruction for each Data Unit to allocate RUs per STA and a time-start pointer (e.g. using for example offset time from the beginning of the UL transmission period) for the Data Unit (TB-PPDU burs)t to be transmitted.
Each STA when sending Data Unit burst (e.g. TB-PPDU) may comprise 802.11 BAck information (e.g. 802.11 Block Ack information) indicating the AP with the reception of DL data within Data Unit burst (e.g. MU-PPDU) during the DL transmission period of the same Framing Slot.

It is noted that though FIG. 14 presents example of two Data Units (e.g. two PPDUs) per Framing Slot, the systems, devices and methods, in accordance with embodiments, may include any combination of Data Units per Framing Slot. The Data Units time duration can vary, but is limited to the DL and UL periods, which are fixed in the synchronized network.

Multi-Frame

Multi-Frame structure as defined in accordance to embodiments, includes multiple Framing Slots. Examples of Multi Frames are illustrated in FIG. 15A, FIG. 15B and FIG. 15C.

In accordance with another embodiment, there is provided a Multi-Frame for OFDMA based wireless systems such as IEEE 802.11 standard for wireless local-area networks. The Multi-Frame comprises multiple Framing Slots, for example, a predefined group of Framing Slots.

According to some embodiments, the Multi-Frame comprises consequent Framing Slots, where AP and STAs are synchronized, respectively, one with the others by having common (e.g. same) timing to identify the beginning and end of the Multi-frame. Additionally, AP and STAs are both synchronized one with the others with shared Framing Slot ordering and numbering within the Multi-Frame.

In accordance with embodiments, in the wireless local-area networks one or more Multi-Frames may be transmitted continuously one after the other.

In some cases, one, some, or all Framing Slots of the Multi-Frame may be the Framing Slot 802 shown in FIG. 13 or Framing Slot 1410 shown in FIG. 14.

In accordance with embodiments, the numbering of Framing Slots is circulated per Multi-Frame size.

FIG. 15A shows, in accordance with embodiments, a plurality of Multi-Frames 1501 (e.g. Multi Frame i, Multi Frame i+1) and Multi Frame structure, in accordance with embodiments.

Each Multi-Frame may comprise for example 16 Framing Slots. It is stressed that the Multi-Frame structure may include any number of Framing Slots, for example, more or less than 16 Framing Slots.

According to one embodiment, one or more of the Framing Slots of each Multi-Frame may be used as Maintenance Framing Slot such as Framing Slot 1510 and 1510' (slot numbered '0'). Preferably, the Maintenance Framing Slot time duration is equivalent to each of the other fixed Frame Slots (slots '1'-'15') time duration in the Multi-Frame. In the example shown in FIG. 15A the time duration of the Maintenance Framing Slot 1510 and other Framing Slots is the same.

In the example shown in FIG. 15A, the Maintenance Framing Slot 1510 is numbered '0' and located at the beginning of Multi-Frame 1500.

In accordance with some embodiments, the Multi-Frame 1500 total time duration and number of Framing Slots may vary between different Multi-Frames, hence, the time duration of a Multi-Frame is determined according to the number of Framing Slots in the Multi-Frame.

In some cases, the Multi-Frame duration can be broadcasted by AP to all STAs by the Maintenance Framing Slot 1510 in a Multi-Frame for the following Multi-Frames to synchronize Framing Slot sequence (e.g. numbering) between AP and STAs.

FIG. 15B shows a Maintenance Framing Slot 1512 (in Synchronous Mode) comprising Long BF Training and FIG. 15C shows a Maintenance Framing Slot (Synchronous Mode) 1522 w/o BF Training. The Maintenance Framing Slot 1512 may comprise, in accordance with embodiments, a Beacon message 1513 for broadcasting specific network information as described hereinbelow and optionally also Beamforming Training procedure. When no Beamforming training procedure exists, the Maintenance Slot 1512 includes DL and UL PPDU following the Beacon message.

In FIG. 15B the numbering in the Maintenance Framing Slot 1512 relates to the typical OFDM symbols numbers needed to transmit DL broadcast message (e.g. Beacon message) and Beamforming training messages sequence.

The Multi-Frame structure, in accordance with embodiments, supports the following capabilities.

Each Multi-Frame has one (or more) Maintenance Framing Slot and the other frames are regular Framing Slots. Regular Framing Slot may be defined as a Framing Slot for DL and UL transmissions between AP and STAs, such as Framing Slot 1302 or Framing Slot 1410 as shown, respectively, in FIG. 13 and FIG. 14.

Each Framing Slot is numbered. In the synchronized network all or some of the Framing Slot numbers should be the same for the Aps (e.g. all Aps) and STAs when transmitted over the air. The numbering can be derived from the Timestamp transmitted in each PPDU. Using Timestamp in each PPDU enables any STA/device (associated and new ones) to be synchronized to the Framing Slot numbering in the Multi-Frame within the network. Such synchronization enables the STA to calculate the Maintenance Framing Slot or any other Framing Slot timing in advance. Such mechanism is useful for efficient scanning period selection and other processes.

Maintenance Framing Slot

Maintenance Framing Slot is used, in accordance with embodiments, by the AP/BST for the Framing Slot scheduling profile announcement and other 802.11 broadcasting information (such as SSID (Service Set Identifier) broadcasting in according to 802.11). Such announcements can be broadcasted using for example 802.11 Beacon message.

The Framing Slot scheduling profile information includes (but not limited to), in accordance with embodiments:

Framing Slot time duration—the time duration of a single Framing Slot in one Multi-Frame can be different from the time duration of a single Framing Slot in other Multi-Frames. For example, for low latency service the Framing Slot can be short (e.g. 1 msec) and for more throughput demanded traffic the Framing Slot may have longer duration (e.g. 5 msec);

Number of Framing Slots per Multi-Frame- to enable different dynamic behavior of traffic and wireless networking changes. For example, in case of static behavior of the traffic and wireless system, the Multi-Frame may include longer periods, but in case of higher dynamicity in traffic changes or wireless user behavior (e.g. mobility) the system may define shorter Multi-Frame duration (meaning less Framing Slots per Multi-Frame);

TDD Split (DL and UL duration periods);

Maintenance Slot periodicity (or Beacon periodicity);

Beamforming training periodicity (as further explained below);

Others: for example, scanning opportunities for Neighboring APs (mobility preparation process).

According to one embodiment, the Maintenance Framing Slot structure as shown in FIG. 14B may be divided to transmission bursts (based on the typical OFDM symbols numbering) as follows:

Transmission burst 1, symbols 0-7: Beacon (HE SU PPDU)+SIFS (Short InterFrame Space timer)

Transmission burst 2, symbols 8-10: NDP-A (Null Data Packet Announcement)+SIFS

Transmission burst 3, symbols 11-13: NDP+SIFS

Transmission burst 4, symbols 14-61: CQI (Channel Quality Indicator) (/Beamforming Report (file size based on various parameters)—this is the longest version Transmission burst 5, symbol 62: Gap According to one embodiment, the Maintenance Framing Slot structure as shown in FIG. 14C may be divided to transmission bursts (based on the typical OFDM symbols numbering) as follows:

Transmission burst 1, symbols 0-7: Beacon (HE SU PPDU)+FIPS

Transmission burst 2, symbols 8-10: PHY Header

Transmission burst 3, symbols 11-30: DL HE MU PPDU (Data)+Block Ack for previous Framing Slot (UL A-MSDU (Aggregated-MAC Packet Data Unit (includes MAC Header+Data))+Trigger Frame (UL RU allocation)

Transmission burst 4, symbols 31 Gap

Transmission burst 5, symbols 35-34: PHY Header

Transmission burst 6, symbols 32-61: UL HE TB PPDU (Data)+Block Ack (for DL A-MSDU)

Transmission burst 7, symbol 62: Gap

In accordance with some embodiments, the structure of the Maintenance Framing Slot is mandatory however the number of symbols per each OFDM burst can vary.

Semi-Synchronous Multi-Frame Structure

According to another embodiments, the methods, devices and systems in accordance with embodiments may use a Semi-Synchronous Multi-Frame structure which is a subset of the fully synchronous Framing Scheduler. The Semi-Synchronous Multi-Frame structure may be applicable for small networks (limited number of APs per network), where DL and UL transmission synchronization is not essential for inter-cell interference avoidance. Such deployment does not require a synchronization source (like as GPS or IEEE 1588). Another advantage of the Semi-Synchronous Multi-Frame structure is R&D implementation simplicity, where most of standard 802.1 lax procedures can be used as is.

This approach enables using CSMA/CA combined with the Multi-Frame structure as illustrated hereinabove with respect to FIG. 13 and FIG. 14. The Semi-Synchronous Multi-Frame structure is suitable for example for unlicensed bands, where regulation requires LBT.

Figure 16:
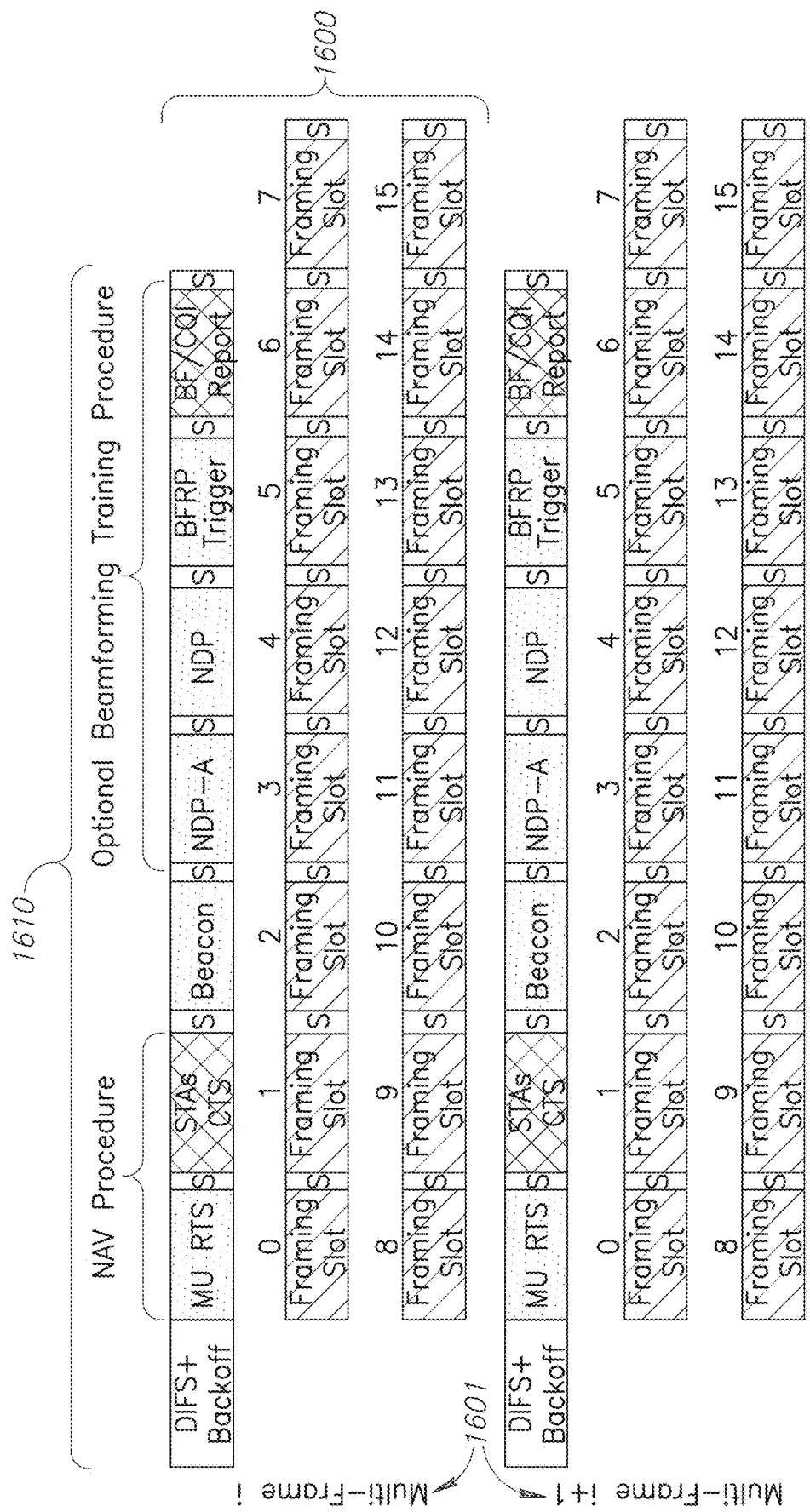

FIG. 16 shows a plurality of Multi-Frames 1601 and a Multi-Frame structure 1600 for non-synchronized network, in accordance with embodiments. The Multi-Frame structure 1600 includes Maintenance Framing Slot 1610, which don't have a fixed time i.e. Maintenance Framing Slot 1610 may have different time durations than the other fixed time/regular Framing Slots (slots '0'-'15') and therefore must be transmitted before the regular Framing Slots are performed. Since this structure is not network synchronized it may include CSMA/CA timers (e.g. DIFS and Backoff) prior to any Multi-Frame. This Multi-Frame structure enables using NAV mechanism as defined in 802.11 using MU RTS/CTS messages and TXOP field.

The Maintenance Framing Slot 1610 includes:
NAV Procedure;
Broadcast Announcement (e.g. Beacon);
Optionally, Beamforming procedure.

The Semi-synchronized scheduler according to embodiments has the following functionalities which are not part of a synchronized scheduling methods and systems:
Using SIFS timer between each PPDU frame;
No piggyback for Trigger Frame and Ack/Block Ack is required. In other words, such frames can be sent as dedicated PPDUs according to 802.1 lax and shown in FIG. 17;
Maintenance Framing Slot may have variable duration vs fixed duration in synchronized scheduling methods;
Using NAV (Network Allocation Vector) 802.11 mechanism to occupy the air resource during Multi-Frame period (using 802.11 RTS/CTS mechanism); and
Using 802.11 DIFS and Contention Window (Backoff) mechanism between Multi-Frames.

Figure 17:
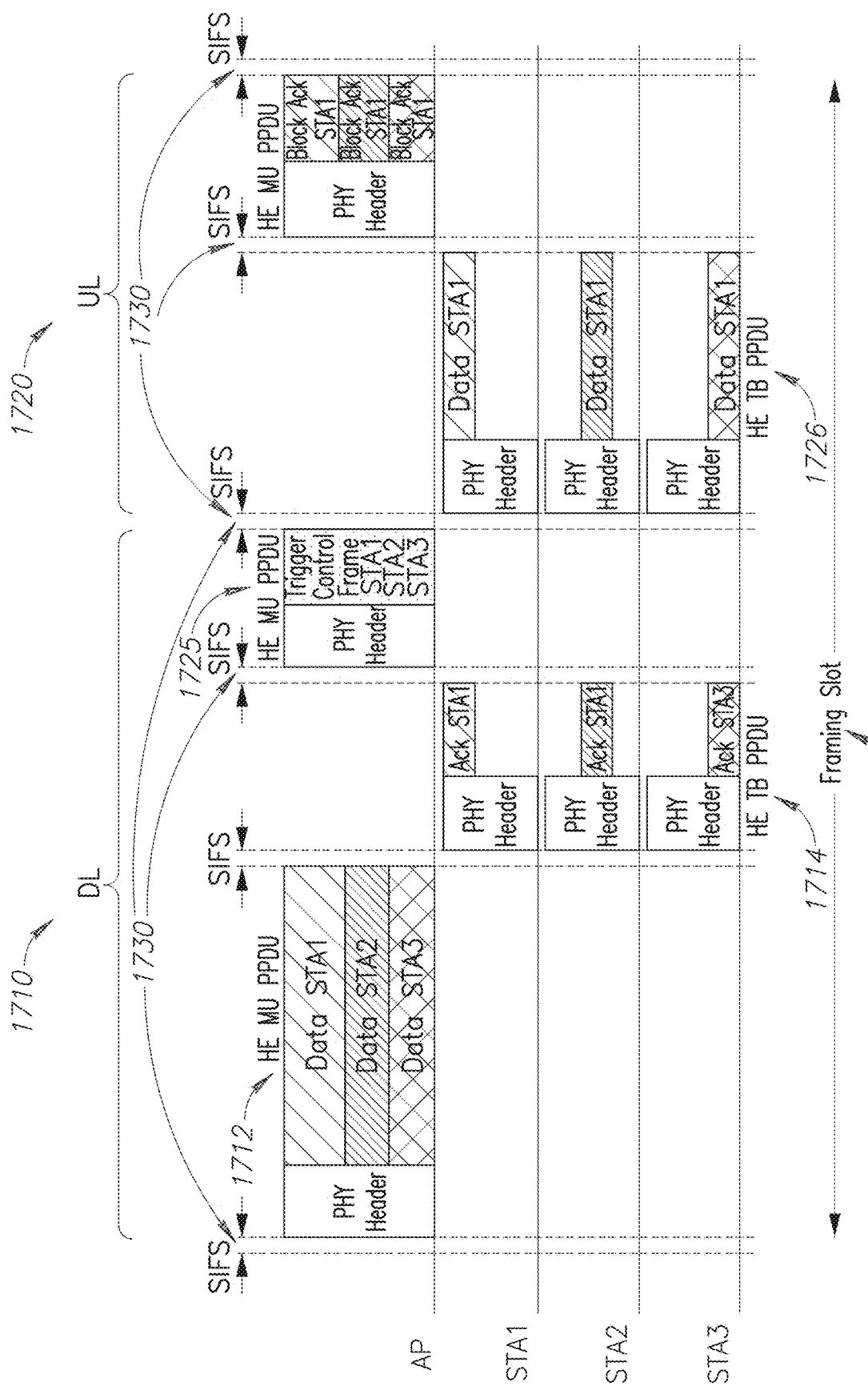

FIG. 17 shows an example of a Framing Slot 1700, which can be used for Semi-Synchronous Multi-Frame procedure, for OFDMA based wireless systems such as IEEE 802.11 standard, in accordance with embodiments. The Framing Slot 1700 may reuse the procedures as defined in 802.1 lax.

The Framing Slot 1700 for semi-synchronized scheduler comprises, in accordance with embodiments, DL and UL procedures—DL procedure 1710 includes Data Unit 1712 (e.g. HE MU-PPDU) signaled by AP toward STAs and in response an acknowledgment message Data unit 1414 (ACK/Block Ack in HE TB PPDU) from STAs toward AP. UL procedure 1720 includes Trigger Frame 1425 sent by AP toward STAs in order to instruct and synchronize regarding simultaneous UL transmission from STAs. Following Trigger Frame 1725, the STAs send Data Units 1726 (e.g. HE TB-PPDU) toward AP. At the end of the Framing Slot 1700, AP responds with an acknowledgment (Block ACK) toward STAs. Each duration of DL and UL procedures can vary in time, however, in accordance with embodiments, the combined DL and UL procedures within the Framing Slot are fixed in time (e.g. 2 msec) and predefined.

In some cases, the semi-synchronous Framing Slot 1700 may include using piggyback approach for Trigger Frame and acknowledgment information as defined for Synchronized Framing Slot as shown in FIG. 13 and FIG. 14, however, between each 802.11 PPDU the system should keep SIFS 1730 timers and consider the SIFS periods as part of the semi-synchronized Framing Slot total duration.

It is stressed that the present invention refers to any OFDMA based systems and networks such as 802.11 standard releases for example 802.11ax.

It is stressed that the present invention refers to any OFDMA based systems and networks such as 802.11 standard releases for example 802.11ax.

It is stressed that all procedures and grouping approaches as described with respect to the present invention are relevant and applicable for LTE and 5GNR PHY structures.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine.

In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for scheduling a plurality Framing Slots in one or more Multi-Frames in a synchronized hierarchical Tree Mesh network, wherein said synchronized hierarchical Tree Mesh network comprising:
  one or more Clusters, each Cluster of said one or more Clusters comprises:
  a Single Root Access Point (AP) used as a master of the Cluster;
  a plurality of Relay Nodes, which are associated directly to the Single Root AP or associated via other Relay Nodes of the plurality of Relay Nodes within the Cluster;
  one or more Station Nodes (STAs), which are associated directly to the Single Root AP or associated via other Relay Nodes of the plurality of Relay Nodes within the Cluster; and
  wherein said one or more Multi-Frames comprise said plurality of Framing Slots, wherein each Framing Slot of said plurality of Framing Slots comprises downlink (DL) and uplink (UL) transmissions, said method comprising the steps of:
  dividing said one or more Clusters to at least two Groups of Relay Nodes;
  allocating, respectively, Framing Slots in said Multi-Frame per each Group of Relay Nodes of said at least two Groups of Relay Nodes, so each Group of Relay Nodes is respectively related to one or more allocated Framing Slots within the Multi-Frame;

dividing said one or more Clusters to a first Group of Relay Nodes, a second Group of Relay Nodes and a Groups of STA Only Nodes, wherein said Group of STA Only Nodes comprise STA Only Nodes directly associated to the Root AP;

allocating Framing Slots of said one or more Multi-Frames to three groups, wherein:

a First Group of Framing Slots comprises:

allocated Framing Slots for associated Node Relays from the first Group of Relay Nodes;

a Second Group of Framing Slots comprises:

allocated Framing Slots for associated Node Relays from the second Group of Relay Nodes;

a Third Group of Framing Slots comprises:

allocated Framing Slots for Groups of STA Only Nodes, and wherein the step of allocating the first group of framing slots comprises allocating the first group of Framing Slots for communication of EVEN hierarchies (hierarchies 0, 2, ... 2n) of the first Group of Relay Nodes of the said hierarchical TreeMesh and serving communication of the ODD hierarchies (e.g. 1, 3, ... 2n+1) of the second Group of Relay Nodes of the hierarchical Tree Mesh;

wherein the step of allocating the second group of Framing Slots comprises: allocating the second group for communication of EVEN hierarchies (hierarchies 0, 2, ... 2n) of the second Group of Relay Nodes of the said hierarchical Tree Mesh and for communication of the ODD hierarchies (hierarchies 1, 3, ... 2n+1) of the first Group of Relay Nodes of the said hierarchical Tree Mesh; and wherein the step of allocating the third group of the Framing Slots comprises allocating the third group for communication of STA Nodes only directly associated to the Root AP.

2. The method of claim 1, comprising allocating Framing Slots to three or more groups of Framing Slots.

3. The method of claim 1, wherein STA Nodes only associated directly to the Root AP are allocated by all three groups of Framing Slots.

4. The method of claim 1, wherein one of the Framing slots of the plurality of Framing Slot is allocated as a Maintenance Framing Slot.

5. The method of claim 1, wherein, said plurality of Relay Nodes have single-radio architecture or dual-radio architecture which use the same or adjacent RF channels.

6. The method of claim 1, wherein each Framing Slot of said one or more Multi-Frames is divided to multiple time periods for said DL and UL transmissions where each time period of said multiple time periods within the Framing Slot is used by said at least two Groups of Relay Nodes communicating in EVEN or ODD Hierarchy Levels.

7. The method of claim 1, comprising:

announcing by the Root AP the Tree Mesh scheduling profile, once any tree mesh topology change caused by new node entry or existing node leaving the cluster said scheduling profile comprises Relay Node distribution between the Node Groups and time resource allocation per each Node Group of Framing Slots or the Framing Slot DL and UL allocation per each Node Group.

8. The method of claim 7, comprising: updating a Hierarchy Level of any new STA Node or roaming Node, connected to the Cluster and existing Node disconnected from the Cluster.

9. The method of claim 8, wherein said Hierarchy Level update procedure is initiated as Broadcast Announcement Procedure or as Unicast Procedure.

10. The method of claim 9, wherein the Broadcast Announcement Procedure comprises:

executing by the New/Roaming STA Node an Association Procedure;

updating the Root AP by a serving Relay Node with an Update Message, which is sent through the serving Relay Nodes within the Cluster;

Relay Nodes and Root AP updating their list of Relay IDs and their Hierarchy Level;

distributing the next Broadcast Message by Root AP or by Relay APs within the Cluster with updated Relay List Nodes said list comprises Hierarchy Level and Node Group per each Relay Node within the Cluster.

11. The method of claim 10, wherein the Broadcast Control information is sent by the Root AP for the Nodes within the Cluster and wherein the Broadcast information delivers the Nodes with the Node Group mapping of the Framing Slots per one or more Multi-Frames.

12. The method of claim 9, wherein the Unicast Announcement Procedure comprises:

executing by the New/Roaming STA Node an Association Procedure;

transmitting Cluster Hierarchy Level update information about the specific Hierarchy Level and Node Group is sent as unicast in one or more Response Messages during the Association Procedure, wherein the Hierarchy Level information delivery is relevant for Node STA new network entry process as well as roaming process between APs within the cluster or between the clusters.

13. A Root Access Point (AP) for scheduling a plurality Framing Slots in one or more Multi-Frames in a synchronized hierarchical Tree Mesh network, wherein said hierarchical Tree Mesh network comprises:

one or more Clusters, wherein each Cluster of said one or more Clusters comprises:

a plurality of Relay Nodes, which are associated directly to the Root AP or associated via other Relay Nodes within the Cluster;

one or more Station Nodes (STAs), which are associated directly to the Root AP or associated via other Relay Nodes within the Cluster; and wherein each Framing Slot of said plurality Framing Slots comprises downlink (DL) and uplink (UL) transmissions, said root AP comprises:

a transceiver configured to transmit and receive a wireless signal; and a processor configured and enabled to control the transceiver, wherein the processor comprises instructions to:

divide said one or more Clusters to at least two Groups of Relay Nodes; and allocate, respectively, said plurality Framing Slots in said one or more Multi-Frames per each Group of at least two Groups Relay Nodes, so each Group is respectively related to one or more allocated Framing Slots within the Multi-Frame, and wherein the step of allocating the first group of framing slots comprises allocating the first group of Framing Slots for communication of EVEN hierarchies (hierarchies 0, 2, ... 2n) of the first Group of Relay Nodes of the said hierarchical Tree Mesh and serving communication of the ODD hierarchies (e.g. 1, 3, . . . 2n+1) of the second Group of Relay Nodes of the hierarchical Tree Mesh;

wherein the step of allocating the second group of Framing Slots comprises allocating the second group for communication of EVEN hierarchies (hierarchies 0, 2, . . . 2n) of the second Group of Relay Nodes of the said hierarchical Tree Mesh and for communication of the ODD hierarchies (hierarchies 1, 3, . . . 2n+1) of the first Group of Relay Nodes of the said hierarchical Tree Mesh; and wherein the step of allocating the third group of the Framing Slots comprises allocating the third group for communication of STA Nodes only directly associated to the Root AP.

14. The Root Access Point (AP) of claim 13, wherein the processor comprises instructions to allocate Framing Slots to three or more groups.

15. The Root Access Point (AP) of claim 13, wherein the processor comprises instructions to:

divide said one or more Clusters to a first Group of Relay Nodes a second Group of Relay Nodes and a Groups of STA Only Nodes;

allocate said plurality of Framing Slots to three groups, wherein:

a First Group of Framing Slots comprises:
allocated Framing Slots for associated Node Relays from the first Node Group;

a Second Group of Framing Slots comprises:
allocated Framing Slots for associated Node Relays from second Node Group;

a Third Group of Framing Slots comprises:
allocated Framing Slots for STA Only Nodes directly associated to the Root AP.

16. The Root Access Point (AP) of claim 13, wherein the processor comprises instructions to divide each Framing Slot of said one or more Multi-Frames to multiple time periods for said DL and UL transmissions where each time period of said multiple time periods within the Framing Slot is used by said at least two Groups of Relay Nodes communicating in EVEN or ODD Hierarchy Levels.

17. The Root Access Point (AP) of claim 13, wherein the single Root Access Point (AP) is used as a master of the Cluster.

* * * * *